(12) United States Patent
Lee et al.

(10) Patent No.: US 10,097,851 B2
(45) Date of Patent: Oct. 9, 2018

(54) PERCEPTUAL OPTIMIZATION FOR MODEL-BASED VIDEO ENCODING

(71) Applicant: Euclid Discoveries, LLC, Concord, MA (US)

(72) Inventors: Nigel Lee, Chesnut Hill, MA (US); Sangseok Park, Flower Mound, TX (US); Myo Tun, McKinney, TX (US); Dane P. Kottke, Durham, NC (US); Jeyun Lee, Austin, TX (US); Christopher Weed, Sudbury, MA (US)

(73) Assignee: Euclid Discoveries, LLC, Concord, MA (US)

( * ) Notice: Subject to any disclaimer, the term of this patent is extended or adjusted under 35 U.S.C. 154(b) by 29 days.

(21) Appl. No.: 15/356,142

(22) Filed: Nov. 18, 2016

(65) Prior Publication Data
US 2017/0070745 A1    Mar. 9, 2017

Related U.S. Application Data

(63) Continuation-in-part of application No. 14/845,067, filed on Sep. 3, 2015, which is a continuation-in-part
(Continued)

(51) Int. Cl.
*H04N 19/513* (2014.01)
*H04N 19/124* (2014.01)
(Continued)

(52) U.S. Cl.
CPC ......... *H04N 19/513* (2014.11); *H04N 19/117* (2014.11); *H04N 19/124* (2014.11);
(Continued)

(58) Field of Classification Search
None
See application file for complete search history.

(56) References Cited

U.S. PATENT DOCUMENTS 5,117,287 A    5/1992    Koike et al.
5,586,200 A   12/1996    Devaney et al.
(Continued)

FOREIGN PATENT DOCUMENTS

EP    0 614 318 A2    9/1994
EP    1 124 379 A2    8/2001
(Continued)

OTHER PUBLICATIONS

Tang, Chih-Wei, "Spatiotemporal Visual Considerations for Video Coding", IEEE Transactions on Multimedia, vol. 9, No. 2, pp. 231-238 (2007).*
(Continued)

*Primary Examiner* — William C Vaughn, Jr.
*Assistant Examiner* — Lindsay Uhl
(74) *Attorney, Agent, or Firm* — Hamilton, Brook, Smith & Reynolds, PC

(57) ABSTRACT

Perceptual statistics are used to compute importance maps that indicate which regions of a video frame are important to the human visual system. Importance maps may be generated from encoders that produce motion vectors and employ motion estimation for inter-prediction. The temporal contrast sensitivity function (TCSF) may be computed from the encoder's motion vectors. Quality metrics may be used to construct a true motion vector map (TMVM), which refines the TCSF. Spatial complexity maps (SCMs) can be calculated from simple metrics (e.g. block variance, block luminance, SSIM, and edge detection). Importance maps with TCSF, TMVM, and SCM may be used to modify the standard rate-distortion optimization criterion for selecting the optimum encoding solution. Importance maps may modify encoder quantization. The spatial information for the importance maps may be provided by a lookup table based
(Continued)

Basic encoder configuration on block variance, where negative and positive spatial QP offsets for block variances are provided.

17 Claims, 11 Drawing Sheets

Related U.S. Application Data of application No. 14/532,947, filed on Nov. 4, 2014, now Pat. No. 9,621,917.

(60) Provisional application No. 61/950,784, filed on Mar. 10, 2014, provisional application No. 62/049,342, filed on Sep. 11, 2014, provisional application No. 62/158,523, filed on May 7, 2015, provisional application No. 62/078,181, filed on Nov. 11, 2014.

(51) Int. Cl.
| | | |
|---|---|---|
| *H04N 19/139* | (2014.01) | |
| *H04N 19/159* | (2014.01) | |
| *H04N 19/13* | (2014.01) | |
| *H04N 19/61* | (2014.01) | |
| *H04N 19/117* | (2014.01) | |
| *H04N 19/14* | (2014.01) | |
| *H04N 19/147* | (2014.01) | |
| *H04N 19/176* | (2014.01) | |
| *H04N 19/172* | (2014.01) | |
| *H04N 19/182* | (2014.01) | |
| *H04N 19/184* | (2014.01) | |
| *H04N 19/527* | (2014.01) | |

(52) U.S. Cl.
CPC ........... *H04N 19/13* (2014.11); *H04N 19/139* (2014.11); *H04N 19/14* (2014.11); *H04N 19/147* (2014.11); *H04N 19/159* (2014.11); *H04N 19/176* (2014.11); *H04N 19/61* (2014.11); *H04N 19/172* (2014.11); *H04N 19/182* (2014.11); *H04N 19/184* (2014.11); *H04N 19/527* (2014.11)

(56) References Cited

U.S. PATENT DOCUMENTS

| | | | |
|---|---|---|---|
| 5,608,458 | A | 3/1997 | Chen et al. |
| 5,710,590 | A | 1/1998 | Ichige et al. |
| 5,748,247 | A | 5/1998 | Hu |
| 5,760,846 | A | 6/1998 | Lee |
| 5,774,591 | A | 6/1998 | Black et al. |
| 5,774,595 | A | 6/1998 | Kim |
| 5,826,165 | A | 10/1998 | Echeita et al. |
| 5,917,609 | A | 6/1999 | Breeuwer et al. |
| 5,933,535 | A | 8/1999 | Lee et al. |
| 5,969,755 | A | 10/1999 | Courtney |
| 5,991,447 | A | 11/1999 | Eifrig et al. |
| 6,044,168 | A | 3/2000 | Tuceryan et al. |
| 6,061,400 | A | 5/2000 | Pearlstein et al. |
| 6,069,631 | A | 5/2000 | Tao et al. |
| 6,088,484 | A | 7/2000 | Mead |
| 6,249,318 | B1 | 6/2001 | Girod et al. |
| 6,256,423 | B1 | 7/2001 | Krishnamurthy et al. |
| 6,307,964 | B1 | 10/2001 | Lin et al. |
| 6,381,275 | B1 | 4/2002 | Fukuhara et al. |
| 6,418,166 | B1 | 7/2002 | Wu et al. |
| 6,463,100 | B1 * | 10/2002 | Cho ............... H04N 19/105 375/240.03 |
| 6,546,117 | B1 | 4/2003 | Sun et al. |
| 6,574,353 | B1 | 6/2003 | Schoepflin |
| 6,608,935 | B2 | 8/2003 | Nagumo et al. |
| 6,611,628 | B1 | 8/2003 | Sekiguchi et al. |
| 6,614,466 | B2 | 9/2003 | Thomas |
| 6,625,310 | B2 | 9/2003 | Lipton et al. |
| 6,625,316 | B1 | 9/2003 | Maeda |
| 6,640,145 | B2 | 10/2003 | Hoffberg et al. |
| 6,646,578 | B1 | 11/2003 | Au |
| 6,661,004 | B2 | 12/2003 | Aumond et al. |
| 6,664,956 | B1 | 12/2003 | Erdem |
| 6,711,278 | B1 | 3/2004 | Gu et al. |
| 6,731,799 | B1 | 5/2004 | Sun et al. |
| 6,731,813 | B1 | 5/2004 | Stewart |
| 6,738,424 | B1 | 5/2004 | Allmen et al. |
| 6,751,354 | B2 | 6/2004 | Foote et al. |
| 6,774,917 | B1 | 8/2004 | Foote et al. |
| 6,792,154 | B1 | 9/2004 | Stewart |
| 6,842,483 | B1 | 1/2005 | Au et al. |
| 6,870,843 | B1 | 3/2005 | Stewart |
| 6,909,745 | B1 | 6/2005 | Puri et al. |
| 6,912,310 | B1 | 6/2005 | Park et al. |
| 6,925,122 | B2 | 8/2005 | Gorodnichy |
| 6,950,123 | B2 | 9/2005 | Martins |
| 7,003,117 | B2 | 2/2006 | Kacker et al. |
| 7,027,599 | B1 | 4/2006 | Entwistle |
| 7,043,058 | B2 | 5/2006 | Cornog et al. |
| 7,088,845 | B2 | 8/2006 | Gu et al. |
| 7,095,786 | B1 | 8/2006 | Schonfeld et al. |
| 7,158,680 | B2 | 1/2007 | Pace |
| 7,162,055 | B2 | 1/2007 | Gu et al. |
| 7,162,081 | B2 | 1/2007 | Timor et al. |
| 7,164,718 | B2 | 1/2007 | Maziere et al. |
| 7,173,925 | B1 | 2/2007 | Dantu et al. |
| 7,184,073 | B2 | 2/2007 | Varadarajan et al. |
| 7,227,893 | B1 | 6/2007 | Srinivasa et al. |
| 7,352,386 | B1 | 4/2008 | Shum et al. |
| 7,356,082 | B1 | 4/2008 | Kuhn |
| 7,415,527 | B2 | 8/2008 | Varadarajan et al. |
| 7,424,157 | B2 | 9/2008 | Pace |
| 7,424,164 | B2 | 9/2008 | Gondek et al. |
| 7,426,285 | B2 | 9/2008 | Pace |
| 7,436,981 | B2 | 10/2008 | Pace |
| 7,457,435 | B2 | 11/2008 | Pace |
| 7,457,472 | B2 | 11/2008 | Pace et al. |
| 7,508,990 | B2 | 3/2009 | Pace |
| 7,574,406 | B2 | 8/2009 | Varadarajan et al. |
| 7,606,305 | B1 | 10/2009 | Rault |
| 7,630,522 | B2 | 12/2009 | Popp et al. |
| 7,715,597 | B2 | 5/2010 | Costache et al. |
| 7,738,550 | B2 | 6/2010 | Kuhn |
| 7,788,191 | B2 | 8/2010 | Jebara |
| 7,869,518 | B2 | 1/2011 | Kim et al. |
| 8,019,170 | B2 | 9/2011 | Wang |
| 8,036,464 | B2 | 10/2011 | Sridhar et al. |
| 8,065,302 | B2 | 11/2011 | Sridhar et al. |
| 8,068,677 | B2 | 11/2011 | Varadarajan et al. |
| 8,086,692 | B2 | 12/2011 | Sridhar et al. |
| 8,090,670 | B2 | 1/2012 | Sridhar et al. |
| 8,135,062 | B1 | 3/2012 | Cote |
| 8,140,550 | B2 | 3/2012 | Varadarajan et al. |
| 8,149,915 | B1 | 4/2012 | Novotny et al. |
| 8,243,118 | B2 | 8/2012 | Pace |
| 8,259,794 | B2 | 9/2012 | Bronstein et al. |
| 8,290,038 | B1 | 10/2012 | Wang et al. |
| 8,290,049 | B2 | 10/2012 | Kondo et al. |
| 8,379,712 | B2 | 2/2013 | Park et al. |
| 8,737,464 | B1 * | 5/2014 | Zhang ............... H04N 19/176 375/240.03 |
| 8,902,971 | B2 | 12/2014 | Pace et al. |
| 8,908,766 | B2 | 12/2014 | Pace |
| 8,942,283 | B2 | 1/2015 | Pace |
| 8,964,835 | B2 | 2/2015 | Pace |
| 9,106,977 | B2 | 8/2015 | Pace |
| 9,532,069 | B2 | 12/2016 | Pace et al. |
| 9,578,345 | B2 | 2/2017 | DeForest et al. |
| 9,621,917 | B2 | 4/2017 | Kottke et al. |
| 9,743,078 | B2 | 8/2017 | DeForest et al. |
| 2001/0038714 | A1 | 11/2001 | Masumoto et al. |
| 2002/0016873 | A1 | 2/2002 | Gray et al. |
| 2002/0025001 | A1 | 2/2002 | Ismaeil et al. |
| 2002/0054047 | A1 | 5/2002 | Toyama et al. |
| 2002/0059643 | A1 | 5/2002 | Kitamura et al. |
| 2002/0073109 | A1 | 6/2002 | Toriumi |
| 2002/0085633 | A1 | 7/2002 | Kim et al. |

(56) References Cited

U.S. PATENT DOCUMENTS

| | | |
|---|---|---|
| 2002/0114392 A1 | 8/2002 | Sekiguchi et al. |
| 2002/0116529 A1 | 8/2002 | Hayden |
| 2002/0164068 A1 | 11/2002 | Yan |
| 2002/0181583 A1 | 12/2002 | Corbera |
| 2002/0196328 A1 | 12/2002 | Piotrowski |
| 2003/0011589 A1 | 1/2003 | Desbrun et al. |
| 2003/0058943 A1 | 3/2003 | Zakhor et al. |
| 2003/0063778 A1 | 4/2003 | Rowe et al. |
| 2003/0103647 A1 | 6/2003 | Rui et al. |
| 2003/0112243 A1 | 6/2003 | Garg et al. |
| 2003/0122966 A1 | 7/2003 | Markman et al. |
| 2003/0163690 A1 | 8/2003 | Stewart |
| 2003/0169812 A1 | 9/2003 | Maziere et al. |
| 2003/0194134 A1 | 10/2003 | Wenzel et al. |
| 2003/0195977 A1 | 10/2003 | Liu et al. |
| 2003/0206589 A1 | 11/2003 | Jeon |
| 2003/0231769 A1 | 12/2003 | Bolle et al. |
| 2003/0235341 A1 | 12/2003 | Gokturk et al. |
| 2004/0013286 A1 | 1/2004 | Viola et al. |
| 2004/0017852 A1 | 1/2004 | Garrido et al. |
| 2004/0022320 A1 | 2/2004 | Kawada et al. |
| 2004/0028139 A1 | 2/2004 | Zaccarin et al. |
| 2004/0037357 A1 | 2/2004 | Bagni et al. |
| 2004/0081359 A1 | 4/2004 | Bascle et al. |
| 2004/0085315 A1 | 5/2004 | Duan et al. |
| 2004/0091048 A1 | 5/2004 | Youn |
| 2004/0107079 A1 | 6/2004 | MacAuslan |
| 2004/0113933 A1 | 6/2004 | Guier |
| 2004/0135788 A1 | 7/2004 | Davidson et al. |
| 2004/0246336 A1 | 12/2004 | Kelly, III et al. |
| 2004/0264574 A1 | 12/2004 | Lainema |
| 2005/0015259 A1 | 1/2005 | Thumpudi et al. |
| 2005/0128306 A1 | 6/2005 | Porter et al. |
| 2005/0185823 A1 | 8/2005 | Brown et al. |
| 2005/0193311 A1 | 9/2005 | Das et al. |
| 2005/0281335 A1 | 12/2005 | Ha |
| 2006/0013450 A1 | 1/2006 | Shan et al. |
| 2006/0029253 A1 | 2/2006 | Pace |
| 2006/0045185 A1 | 3/2006 | Kiryati |
| 2006/0067585 A1 | 3/2006 | Pace |
| 2006/0120571 A1 | 6/2006 | Tu et al. |
| 2006/0120613 A1 | 6/2006 | Su et al. |
| 2006/0133681 A1 | 6/2006 | Pace |
| 2006/0177140 A1 | 8/2006 | Pace |
| 2006/0233448 A1 | 10/2006 | Pace et al. |
| 2006/0204115 A1 | 12/2006 | Burazerovic |
| 2006/0274949 A1 | 12/2006 | Gallagher et al. |
| 2007/0025373 A1 | 2/2007 | Stewart |
| 2007/0053513 A1 | 3/2007 | Hoffberg |
| 2007/0071100 A1 | 3/2007 | Shi et al. |
| 2007/0071336 A1 | 3/2007 | Pace |
| 2007/0153025 A1 | 7/2007 | Mitchell et al. |
| 2007/0183661 A1 | 8/2007 | El-Maleh et al. |
| 2007/0185946 A1 | 8/2007 | Basri et al. |
| 2007/0239778 A1 | 10/2007 | Gallagher |
| 2007/0268964 A1 | 11/2007 | Zhao |
| 2007/0297645 A1 | 12/2007 | Pace et al. |
| 2008/0027917 A1 | 1/2008 | Mukherjee et al. |
| 2008/0040375 A1 | 2/2008 | Vo et al. |
| 2008/0043848 A1 | 2/2008 | Kuhn |
| 2008/0101652 A1 | 5/2008 | Zhao et al. |
| 2008/0117977 A1 | 5/2008 | Lee et al. |
| 2008/0152008 A1 | 6/2008 | Sun et al. |
| 2008/0232477 A1 | 9/2008 | Wang et al. |
| 2008/0240247 A1 | 10/2008 | Lee et al. |
| 2009/0040367 A1 | 2/2009 | Zakrzewski et al. |
| 2009/0055417 A1 | 2/2009 | Hannuksela |
| 2009/0067719 A1 | 3/2009 | Sridhar et al. |
| 2009/0080855 A1 | 3/2009 | Senftner et al. |
| 2009/0112905 A1 | 4/2009 | Mukerjee et al. |
| 2009/0129474 A1 | 5/2009 | Pandit et al. |
| 2009/0158370 A1 | 6/2009 | Li et al. |
| 2009/0168884 A1 | 7/2009 | Lu et al. |
| 2009/0175538 A1 | 7/2009 | Bronstein et al. |
| 2009/0262804 A1 | 10/2009 | Pandit et al. |
| 2009/0292644 A1 | 11/2009 | Varadarajan et al. |
| 2010/0008424 A1 | 1/2010 | Pace |
| 2010/0027861 A1 | 2/2010 | Shekhar et al. |
| 2010/0049739 A1 | 2/2010 | Varadarajan et al. |
| 2010/0073458 A1 | 3/2010 | Pace |
| 2010/0074600 A1 | 3/2010 | Putterman et al. |
| 2010/0086062 A1 | 4/2010 | Pace |
| 2010/0088717 A1 | 4/2010 | Candelore et al. |
| 2010/0124274 A1* | 5/2010 | Cheok .................. H04N 19/176 375/240.03 |
| 2010/0135575 A1 | 6/2010 | Guo et al. |
| 2010/0135590 A1 | 6/2010 | Yang et al. |
| 2010/0167709 A1 | 7/2010 | Varadarajan |
| 2010/0271484 A1 | 10/2010 | Fishwick et al. |
| 2010/0272185 A1 | 10/2010 | Gao et al. |
| 2010/0278275 A1 | 11/2010 | Yang et al. |
| 2010/0290524 A1 | 11/2010 | Lu et al. |
| 2010/0316131 A1 | 12/2010 | Shanableh et al. |
| 2010/0322300 A1 | 12/2010 | Li et al. |
| 2010/0322309 A1 | 12/2010 | Huang et al. |
| 2011/0019026 A1 | 1/2011 | Kameyama |
| 2011/0055266 A1 | 3/2011 | Varadarajan et al. |
| 2011/0058609 A1 | 3/2011 | Chaudhury et al. |
| 2011/0087703 A1 | 4/2011 | Varadarajan et al. |
| 2011/0182352 A1 | 7/2011 | Pace |
| 2011/0221865 A1 | 9/2011 | Hyndman |
| 2011/0285708 A1 | 11/2011 | Chen et al. |
| 2011/0286627 A1 | 11/2011 | Takacs et al. |
| 2012/0044226 A1 | 2/2012 | Singh et al. |
| 2012/0079004 A1 | 3/2012 | Herman |
| 2012/0105654 A1 | 5/2012 | Kwatra et al. |
| 2012/0155536 A1 | 6/2012 | Pace |
| 2012/0163446 A1 | 6/2012 | Pace |
| 2012/0281063 A1 | 11/2012 | Pace |
| 2013/0027568 A1 | 1/2013 | Zou et al. |
| 2013/0035979 A1 | 2/2013 | Tenbrock |
| 2013/0083854 A1 | 4/2013 | Pace |
| 2013/0107948 A1 | 5/2013 | DeForest et al. |
| 2013/0114703 A1 | 5/2013 | DeForest et al. |
| 2013/0170541 A1 | 7/2013 | Pace et al. |
| 2013/0230099 A1 | 9/2013 | DeForest et al. |
| 2014/0286433 A1 | 9/2014 | He et al. |
| 2014/0355687 A1 | 12/2014 | Takehara et al. |
| 2015/0124874 A1 | 5/2015 | Pace |
| 2015/0189318 A1 | 7/2015 | Pace |
| 2015/0256850 A1 | 9/2015 | Kottke |
| 2016/0073111 A1 | 3/2016 | Lee et al. |

FOREIGN PATENT DOCUMENTS

| | | |
|---|---|---|
| EP | 1 250 012 | 10/2002 |
| EP | 1 426 898 A2 | 6/2004 |
| EP | 1 779 294 A2 | 5/2007 |
| JP | H03253190 A | 11/1991 |
| JP | H05244585 A | 9/1993 |
| JP | 07-038873 | 2/1995 |
| JP | H0795587 A | 4/1995 |
| JP | 07-288789 | 10/1995 |
| JP | 08-235383 | 9/1996 |
| JP | 08-263623 | 10/1996 |
| JP | 2000-209555 A | 7/2000 |
| JP | 2001-100731 A | 4/2001 |
| JP | 2001-103493 A | 4/2001 |
| JP | 2002-525735 T | 8/2002 |
| JP | 2004-94917 A | 3/2004 |
| JP | 2004 356747 | 12/2004 |
| JP | 2006-521048 A | 9/2006 |
| JP | 2007-504696 A | 3/2007 |
| JP | 2009-501479 | 1/2009 |
| JP | 2010-517426 A | 5/2010 |
| TW | 200521885 | 7/2005 |
| TW | 200527327 | 8/2005 |
| TW | 200820782 | 5/2008 |
| WO | WO 98/27515 | 6/1998 |
| WO | WO 98/59497 A1 | 12/1998 |
| WO | WO 99/26415 | 5/1999 |
| WO | WO 00/16563 | 3/2000 |
| WO | WO 00/45600 | 8/2000 |
| WO | WO 02/102084 A1 | 12/2002 |

(56) References Cited

FOREIGN PATENT DOCUMENTS

| | | |
|---|---|---|
| WO | WO 03/041396 A1 | 5/2003 |
| WO | WO 2005/055602 A1 | 6/2005 |
| WO | WO 2005/107116 A2 | 11/2005 |
| WO | WO 2006/015092 A2 | 2/2006 |
| WO | WO 2006/034308 A2 | 3/2006 |
| WO | WO 2006/055512 A2 | 5/2006 |
| WO | WO 2006/083567 A1 | 8/2006 |
| WO | WO 2006/105470 A1 | 10/2006 |
| WO | WO 2007/007257 A1 | 1/2007 |
| WO | WO 2007/146102 A2 | 12/2007 |
| WO | WO 2008/091483 A2 | 7/2008 |
| WO | WO 2008/091484 A2 | 7/2008 |
| WO | WO 2008/091485 A2 | 7/2008 |
| WO | WO 2010/042486 A1 | 4/2010 |
| WO | WO 2010/118254 | 10/2010 |
| WO | WO 2011/156250 A1 | 12/2011 |
| WO | WO 2012/033970 A1 | 3/2012 |
| WO | WO 2013/148002 A2 | 10/2013 |
| WO | WO 2013/148091 A1 | 10/2013 |
| WO | WO 2014/051712 A1 | 4/2014 |
| WO | WO 2015/138008 A1 | 9/2015 |
| WO | WO 2016/040116 A1 | 3/2016 |

OTHER PUBLICATIONS

Chen, Zhenzhong, et al., "Perception-Oriented Video Coding based on Foveated JND Model", Picture Coding Symposium 2009, Section 2 (May 2009).*

Li, Z., et al., "Visual Attention Guided Bit Allocation in Video Compression", Image and Vision Computing 29, pp. 1-14 (2011).*

Hrarti, M., et al., "Attentional mechanisms driven adaptive quantization and selective bit allocation scheme for H.264/AVC", Signal Processing: Image Communication 28, pp. 843-855 (2013).*

Zheng, Y. et al., "H.264 ROI Coding Based on Visual Perception", 5th International Conference on Visual Information Engineering, Institution of Engineering and Technology, pp. 829-834 (2008).*

Amit, Yali, 2D Object Detection and Recognition: Models, Algorithms, and Networks, The MIT Press, Cambridge, Massachusetts, pp. 147-149 (Sections 7.3: Detecting Pose and 7.4: Bibliographical Notes and Discussion) (2002).

Antoszczyszyn, P.M., et al., "Tracking of the Motion of Important Facial Features in Model-Based Coding," Signal Processing, 66(2):249-260, (Apr. 30, 1998).

Bay, H., et al., "SURF: Speeded Up Robust Features", ETH Zurich {bay, vangool}@vision.ee.ethz.ch, 1-14 (Date Not Provided).

"Bit-Torrent: Introduction", Retrieved on: Jan. 18, 2006, retrieved online at: http://web.archive.org/web/20060118042451/http://www.bittorrent.com/introduction.html.

Brenneman, A., et al., "x264", Wikipedia—The Free Encyclopedia: http://en.wikipedia,org/wiki/X264, 1-5 (Date Not Provided).

Cho, J-H., et al., "Object detection using multi-resolution mosaic in image sequences," Signal Processing. Image Communication, Elsevier Science Publishers, Amsterdam, vol. 20, No. 3, pp. 233-253, (Mar. 1, 2005).

Dodgson, N. A., "Image resampling," Technical Report, UCAM-CL-TR-261, ISSN 1476-2986, University of Cambridge, Computer Laboratory, (264 pp.) (Aug. 1992).

Doenges, P. K., "MPEG-4: Audio/Video and Synthetic Graphics/Audio for Mixed Media," Signal Processing: Image Communication, No. 9, pp. 433-463 (1997).

Ebrahimi, T., et al. "MPEG-4 natural video coding—An Overview", Signal Processing: Image Communication 15:365-385 (2000).

Fischler, M.A., et al., "Random Sample Consensus: A Paradigm for Model Fitting with Applications to Image Analysis and Automated Cartography," Communications of the Association for Computing Machinery, 24(6):381-395 (1981).

Fukuhara, T., et al., "3-D Motion Estimation of Human Head for Model-Based Image Coding," IEEE Proceedings-I, 140(1):26-35, (Feb. 1, 1993).

Garrett-Glaser, J., "Diary of an x264 Developer", http://x264dev.multimedia.cx/, 1-7 (2008).

Gorodinchy, et al., "Seeing faces in video by computers. Editorial for Special Issue on Face Processing in Video Sequences," Image and Vision Computing, Guilford, GB, vol. 24, No. 6, pp. 551-556 (Jun. 1, 2006).

Gunsel, B. et al., "Content based access to video objects: Temporal segmentation, visual summarization, and feature extraction," Signal Processing, vol. 66, pp. 261 280 (1998).

"H.264/MPEG-4 AVC", Wikipedia—The Free Encyclopedia: http://en.wikipedia,org/wiki/X264, 1-17 (Date Not Provided).

Harris, C., et al., "A Combined Corner nad Edge Detector," Alvey Vision Conference, Proceedings of the Alvey Vision Conference, p. 147 (1988).

Huang, R. et al., "Sparse representation of images with hybrid linear models," in Proc. ICIP '04, 2(1281 1284) Oct. 2004.

Huang, T.S. et al., "Chapter 5: Three-Dimensional Model-Based Image Communication," Visual Information Representation, Communication, and Image Processing, Editors: Chen, Chang Wen, et al., Marcel Dekker, Inc., New York, New York, pp. 97-117 (1999).

Intel Integrated Performance Primitives—Documentation, http://software.intel.com/en-us/articles/intel-integrated-performance-primitives-documentation/ (Retrieved on Dec. 21, 2012).

Irani, M., et al., "Detecting and Tracking Multiple Moving Objects Using Temporal Integration," European Conference on Computer Vision, 282-287 (1992).

Jolliffe, I.T., "Principal Component Analysis, Second Edition," Springer, 518 pp., Apr. 2002.

Jones, M. and P. Viola, "Fast Multi View Face Detection," Mitsubishi Electrical Laboratories, Jul. 2003 (10 pp.).

Kass, Michael, Andrew Witzin, and Demetri Terzopoulos, "Snakes: Active contour Models," International Journal of Computer Vision (1988).

Keysers, et al., "Deformation Models for Image Recognition," IEEE Transactions on Pattern Analysis and Machine Intelligence, 29(8):1422-1435 (2007).

Lowe, D.G., "Distinctive Image Features from Scale-Invariant Keypoints", International Journal of Computer Vision, 1-28 (2004).

Miners, B. W., et al., "Dynamic Facial Expression Recognition Using Fuzzy Hidden Markov Models," Systems, Man and Cybernetics, 2005 IEEE International Conference on, IEEE, Piscataway, N.J., USA, vol. 2, pp. 1417-1422 (Oct. 10, 2005).

Neff, et al., "Matching-Pursuit Based Video Compression", Department of Electrical Engineering and Computer Science, MPEG Meeting, Mar. 11, 1995.

OpenCV Documentation Page, http://docs.opencv.org/ (Retrieved on Dec. 21, 2012).

Osama, et al., "Video Compression Using Matching Pursuits", IEEE Transactions on Circuits and Systems for Video Technology, vol. 9, No. 1, Feb. 1999.

Park, et al., "Qualitative Estimation of Camera Motion Parameters From the Linear Composition of Optical Flow," Pattern Recognition: The Journal of the Pattern Recognition Society, 37:767-779 (2004).

Pati, Y.C., et al., "Orthogonal Matching Pursuit: Recursive Function Approximation with Applications to Wavelet Decomposition", 27th Annual Asilomar conference on Signals systems and Computers ,1-5 (1993).

Piamsa nga, P. and N. Babaguchi, "Motion estimation and detection of complex object by analyzing resampled movements of parts," in Proc. ICIP '04, 1 (365 368), Oct. 2004.

Pique, R. et al., "Efficient Face Coding in Video Sequences Combining Adaptive Principal Component Analysis and a Hybrid Codec Approach," Proceedings of International Conference on Acoustics, Speech and Signal Processing, 3:629-632(2003).

Rehg, J. M. and Witkin, A. P., "Visual Tracking with Deformation Models," Proc. IEEE Int'l. Conf. on Robotics and Automation, pp. 844-850 (Apr. 1991).

Reinders, M.J.T., et al., "Facial Feature Localization and Adaptation of a Generic Face Model for model-Based Coding," Signal Processing: Image Communication, No. 7, pp. 57-74 (1995).

Richardson, I., "Vcodex White Paper: Video Compression Patents," Vcodex Ltd., pp. 3-6 (2008-2011).

(56) References Cited

OTHER PUBLICATIONS

Rong, S. et al., "Efficient spatiotemporal segmentation and video object generation for highway surveillance video," in *Proc. IEEE Int'l, Conf. Communications, Circuits and Systems and West Sino Expositions*, 1(580 584), Jun. Jul. 2002.

Schröder, K., et al., "Combined Description of Shape and Motion in an Object Based Coding Scheme Using Curved Triangles," Proceedings of the International Conference on Image Processing, 2:390-393 (1995).

"Series H: Audiovisual and Multimedia Systems: Infrastructure of audiovisual services—Coding of moving video; Advanced video coding for generic audiovisual services", ITU-T, H.264: 1-657 (2012).

Shin, J. et al., "Optical flow-based real-time object tracking using non-prior training active feature model," Academic Press Limited, GB, vol. 11, No. 3, pp. 204-218 (Jun. 1, 2005).

Tabatabai, A. J., et al., "Motion Estimation Methods for Video Compression—A Review," Journal of the Franklin Institute, 335(8): 1411-1441 (1998).

Tao, H., et al., "Compression of MPEG-4 Facial Animation Parameters for Transmission of Talking Heads," *IEEE Transactions on Circuits and Systems for Video Technology*, vol. 9, No. 2, pp. 264-276 (Mar. 1999).

Toklu, C. et al., "Simultaneous Alpha Map Generation and 2 D Mesh Tracking for Multimedia Applications," *Proceedings of the International Conference on Image Processing: 1997*, (113 116) (Oct. 1997).

Urban, M., "Harris Interest Operator," Jan. 28, 2003, http://cmp.felk.cvut.cz/cmp/courses/dzo/resources/lecture_harris_urban.pdf (23 pp.).

Vidal, R. and R. Hartley, "Motion segmentation with missing data using PowerFactorization and GPCA," in *Proc. CVPR* 04, 2 (II-310-316), Jun.-Jul. 2004.

Vidal, R. et al., "Generalized principal component analysis (GPCA)", in *Proc. CVPR '03*, 1 (I621-628), Jun. 2003.

Viola, P. and Jones, M.J., "Robust Real-Time Face Detection," International Journal of Computer Vision, 57(2):137-154 (2004).

Viola, P. and M. Jones, "Rapid Object Detection using a Boosted Cascade of Simple Features," *Proceedings of the 2001 IEEE Computer Society Conference on Computer Vision and Pattern Recognition*, 2001, vol. 1, pp. 511 518.

Wang, Y., "Use of Two-Dimensional Deformable Mesh Strucutures for Video Coding, Part II—The Analysis Problem and a Region-Based Coder Employing an Active Mesh Representation" IEEE Transactions on Circuits and Systems for Video Technology, 6(6):1051-8215 (1996).

Wang, Y., "Use of Two-Dimensional Deformable Mesh Structures for Video Coding, Part I—The Synthesis Problem: Mesh-Based Function Approximation and Mapping" IEEE Transactions on Circuits and Systems for Video Technology, 6(6):1051-8215 (1996).

Wiegand, T., et al., "Overview of the H.264/AVC Video Coding Standard", IEEE Transactions on Circuits and Systems for Video Technology, 13(7):560-576 (2003).

Wikipedia, Motion Perception; 6 pages; downloaded on Aug. 24, 2015; See https://en.wikipedia.org/wiki/Motion_perception#The_aperture_problem.

Zhang, et al., "A Novel Video Coding Framework by Perceptual Representation and Macroblock-Based Matching Pursuit Algorithm", *Department of Computer Science and Technology*, pp. 322-331 (2007).

Extended European Search Report for 06 73 3758.4, dated Mar. 8, 2011 (17 pages).

Extended European Search Report for 06 74 0318.8, dated May 6, 2011 (14 pages).

International Search Report for International Application No. PCT/US2009/059653, 8 pp., dated Feb. 2, 2010.

Invitation to Pay Additional Fees and, Where Applicable, Protest Fee, for International Application No. PCT/US2008/000090, mailed Jun. 2, 2010.

Notification of Transmittal of the International Search Report and the Written Opinion of the International Searching Authority, or the Declaration, for International Application No. PCT/US2008/000090, 19 pp., dated Aug. 18, 2010.

PCT International Search Report, for International Application No. PCT/US2008/000091, dated Sep. 23, 2008, 5 pages.

PCT International Search Report, for International Application No. PCT/US2008/000092, dated Sep. 23, 2008, 5 pages.

Written Opinion of the International Searching Authority for International Application No. PCT/US2009/059653, 8 pp., dated Feb. 2, 2010.

Braspenning, R., et al., "True-Motion Estimation using Features Correspondences," *Visual Communications and Image Processing*, SPIE vol. 5308, (2004).

Chen, M., et al., "Efficient Multi-Frame Motion Estimation Algorithms for MPEG-4 AVC/JVT/H.264," *IEEE International Symposium on Circuits and Systems*, pp. III-737 (May 2004).

Lee, T., et al., "A New Motion Vector Composition Algorithm for H.264 Multiple Reference Frame Motion Estimation," retrieved from the Internet on Jan. 16, 2015: http://eprints.lib.hokudai.ac.jp/dspace/bitstream/2115/39749/1/TA-P2-7.

Smith, L., et al., "A tutorial on Principal Components Analysis," Feb. 26, 2002.

Su, Y., et al., "Fast Multiple Reference Frame Motion Estimation for H.264/AVC," *IEEE Transactions on Circuits and Systems for Video Technology, IEE Service Center*, vol. 16(3), pp. 447-452 (Mar. 2006).

Notification of Transmittal of the International Search Report and the Written Opinion of the International Searching Authority, or the Declaration, for International Application No. PCT/US2014/063913, "Continuous Block Tracking for Temporal Prediction in Video Encoding," 11 pages, dated May 27, 2015.

Su., Yeping, et al., "Fast multiple reference frame motion estimation for H.264/AVC," IEEE Transactions on Circuits and Systems for Video Technology, 16(3): 447-452 (2006).

Bulla, C. et al., "High Quality Video Conferencing: Region of Interest Encoding and Joint Video/Audio Analysis," International Journal on Advances in Telecommunications, 6(3-4): 153-163 (Dec. 2013).

Chen, Z. et al., "Perception-oriented video coding based on foveated JND model A," Picture Coding Symposium 2009, Section 2 (May 2009).

Li, Z., et al., "Visual attention guided bit allocation in video compression," *Image and Vision Computing*, 29(1): 1-14 (Jan. 2011).

Naccari, M. et al., "Improving HEVC Compression Efficiency by Intensity Dependant Spatial Quantisation," MPEG Meeting (Jul. 2012).

Richardson, Iain E., *The H.264 Advanced Video Compression Standard*, 2nd Edition, Chapter 7: H.264 Transform and Coding, Apr. 20, 2010.

Tang, C-W., "Spatiotemporal Visual Considerations for Video Coding," IEEE Transactions on Multimedia, 9(2): 231-238 (Feb. 2007).

Wikipedia, "Lumi masking," Retrieved from the Internet: https://web.archive.org/web/20061124153834/http://en.wikipedia.org/wiki/Lumi_masking, Retrieved on: Nov. 8, 2006, 1 page.

International Search Report and Written Opinion for Int'l Application No. PCT/US2015/048353, titled: Perceptual Optimization for Model-Based Video Encoding, dated Feb. 17, 2016.

International Preliminary Report on Patentability for Int'l Application No. PCT/US2015/048353, titled: Perceptual Optimization for Model-Based Video Encoding, dated Mar. 23, 2017.

Office Action from U.S. Appl. No. 14/845,067, entitled "Perceptual Optimization for Model-Based Video Encoding" dated Nov. 30, 2017.

\* cited by examiner

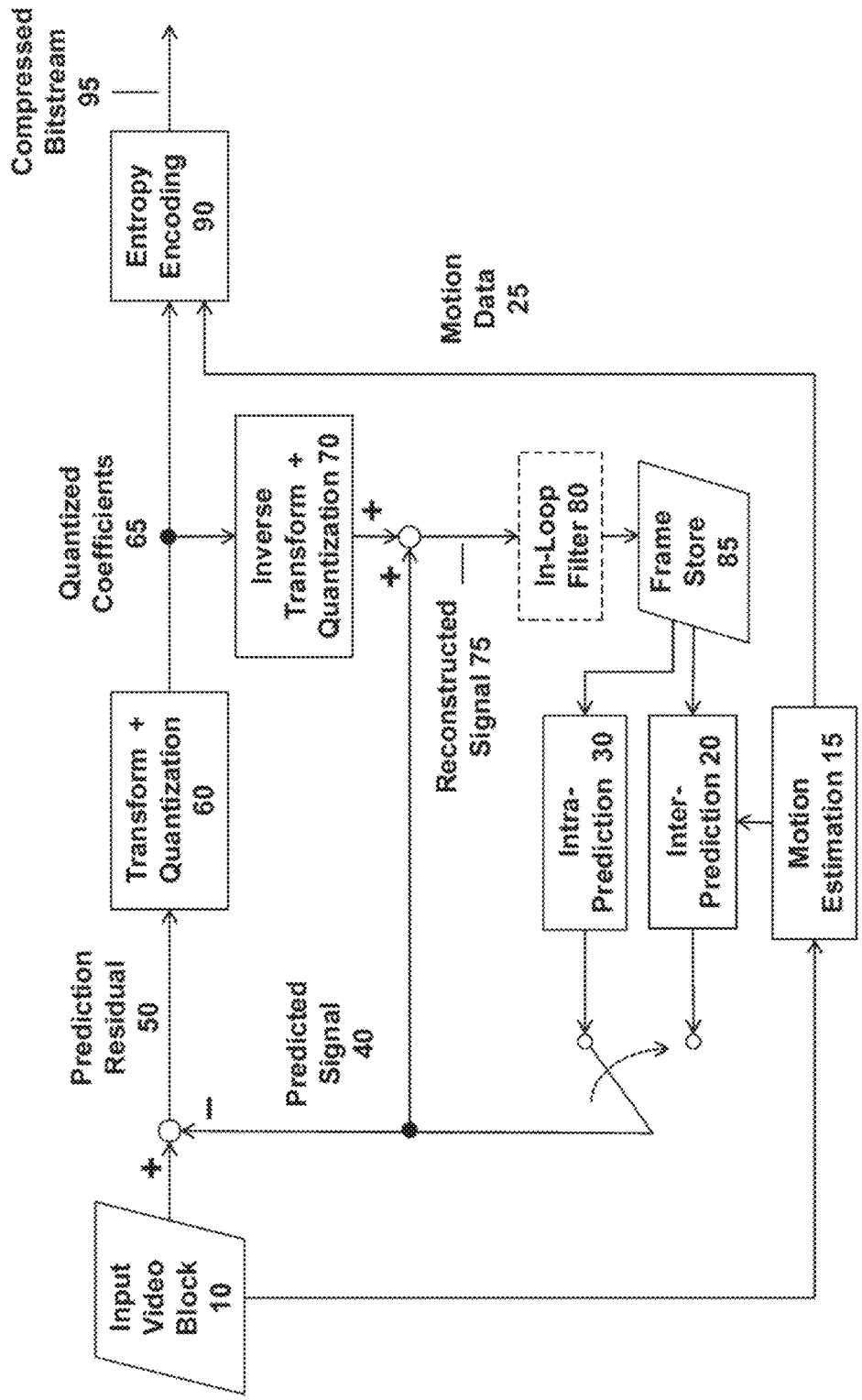
Figure 1: Basic encoder configuration

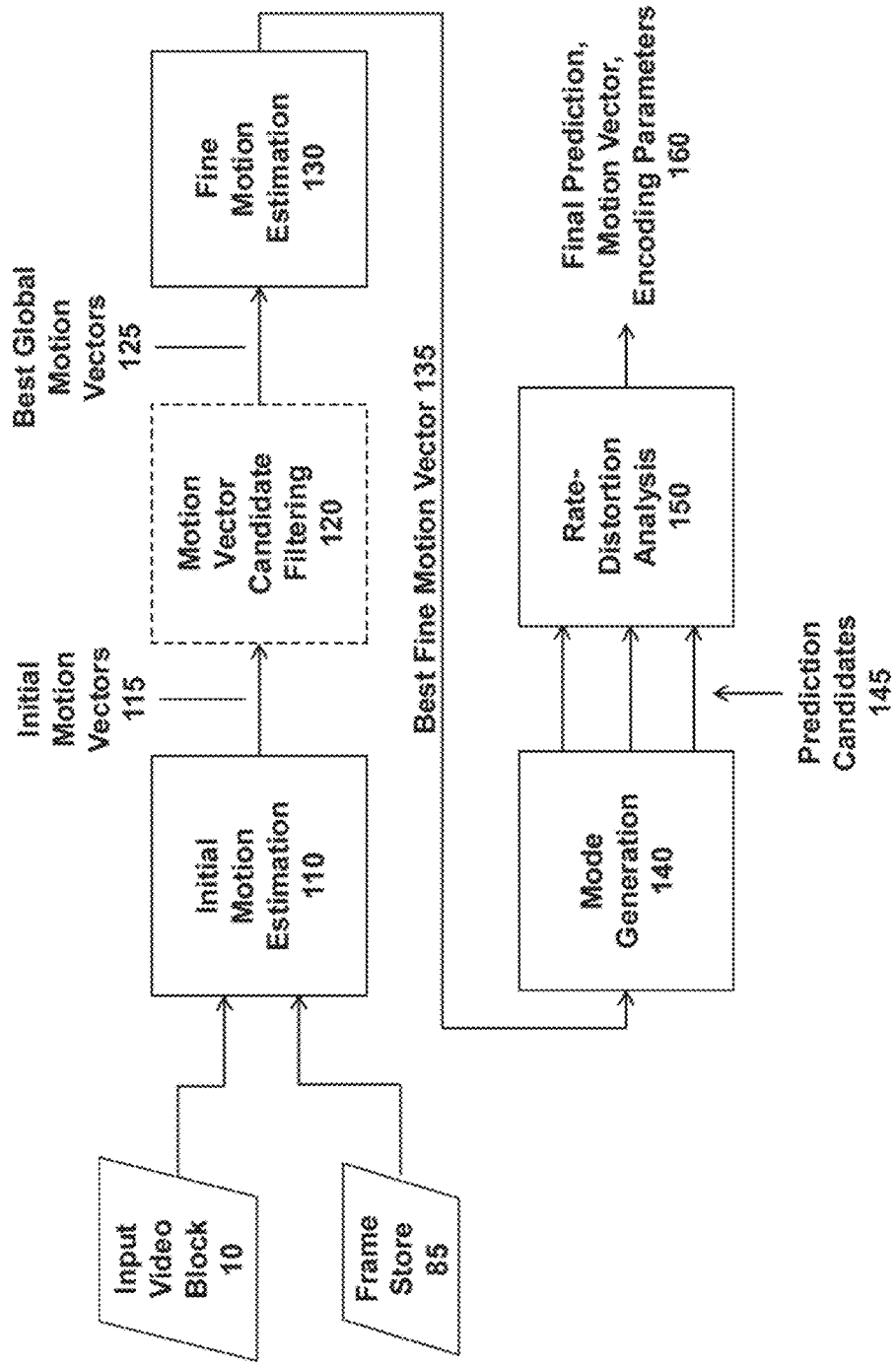
Figure 2: Inter-prediction steps

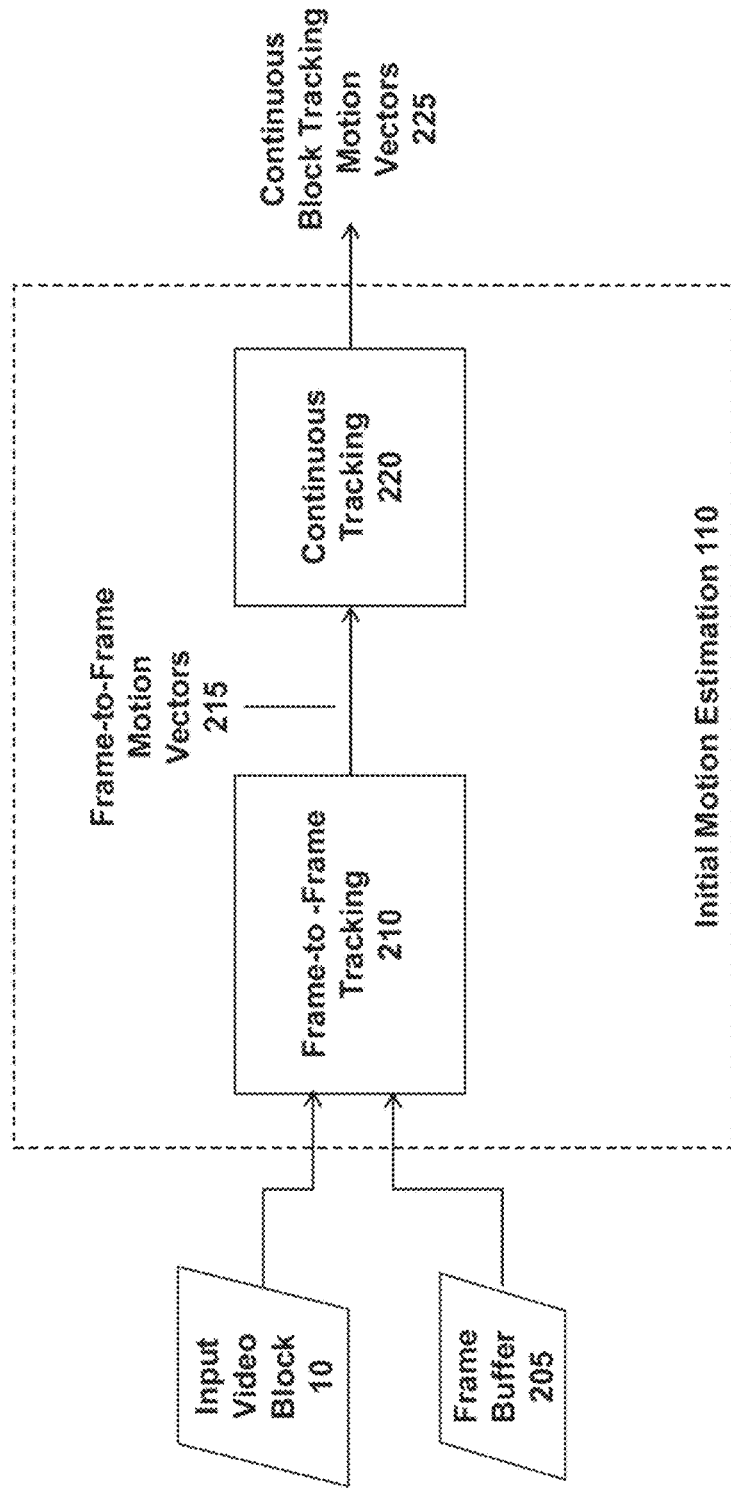
Figure 3: Initial motion estimation via continuous block tracking

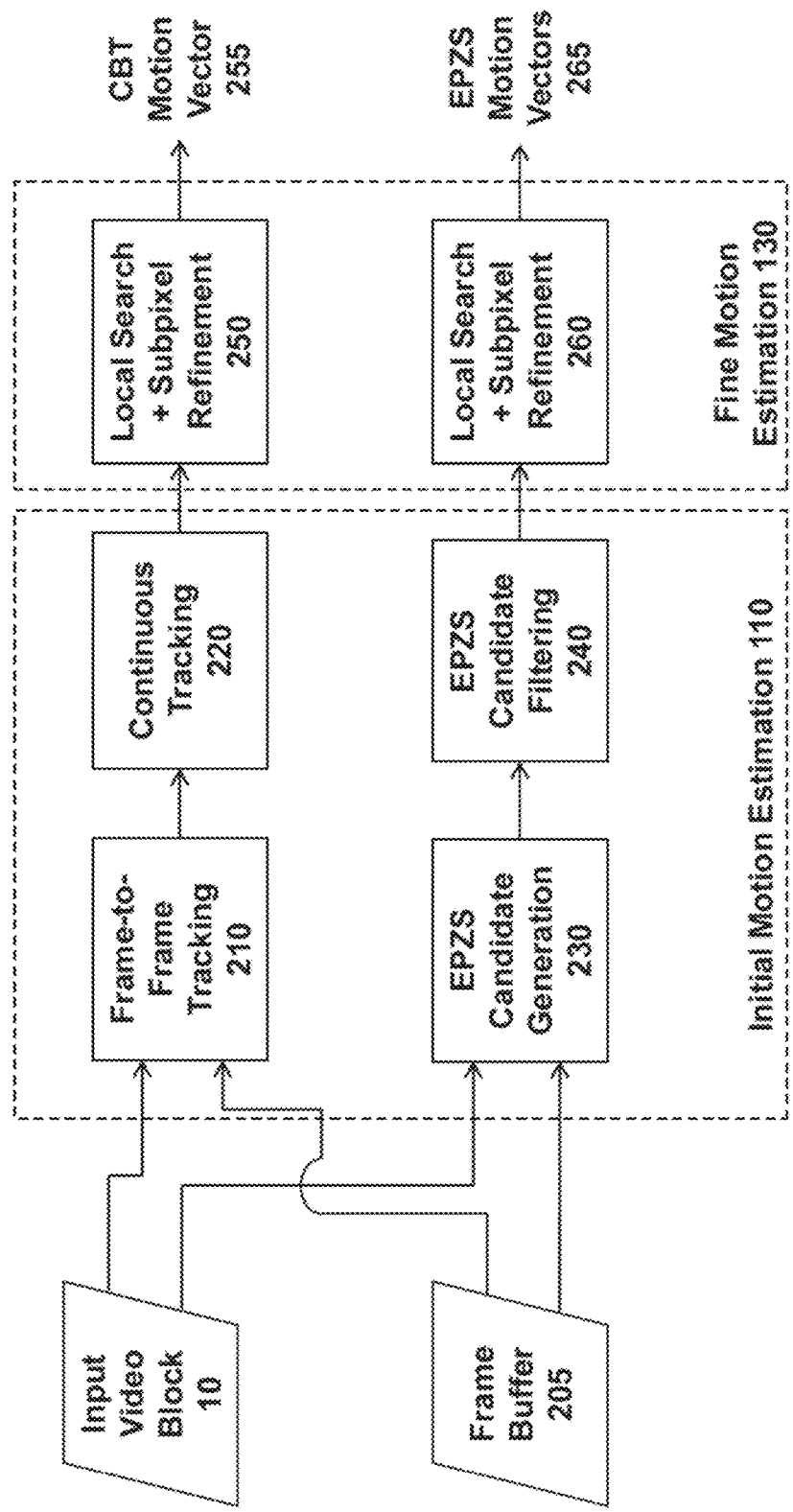
Figure 4: Unified motion estimation via combination of continuous block tracking (CBT) and enhanced predictive zonal search (EPZS)

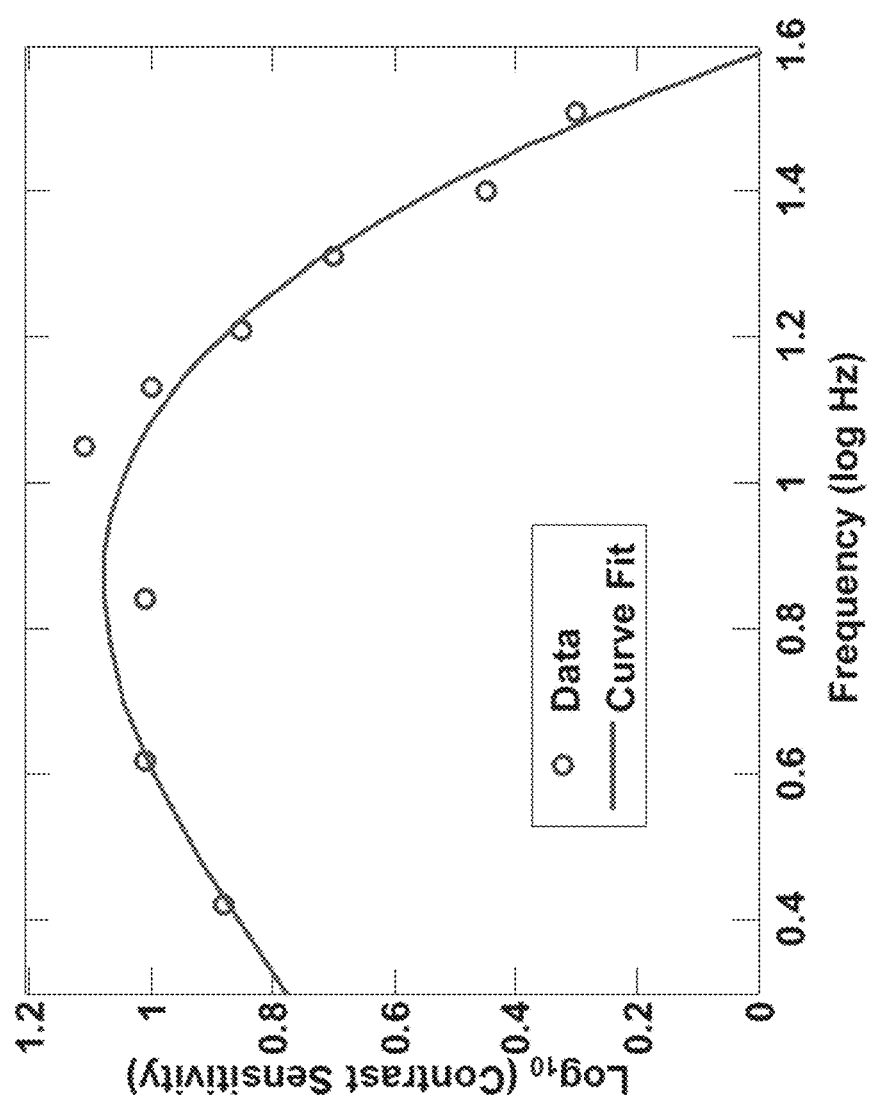
Figure 5: Temporal contrast sensitivity function, parafoveal target [Wooten, 2010]

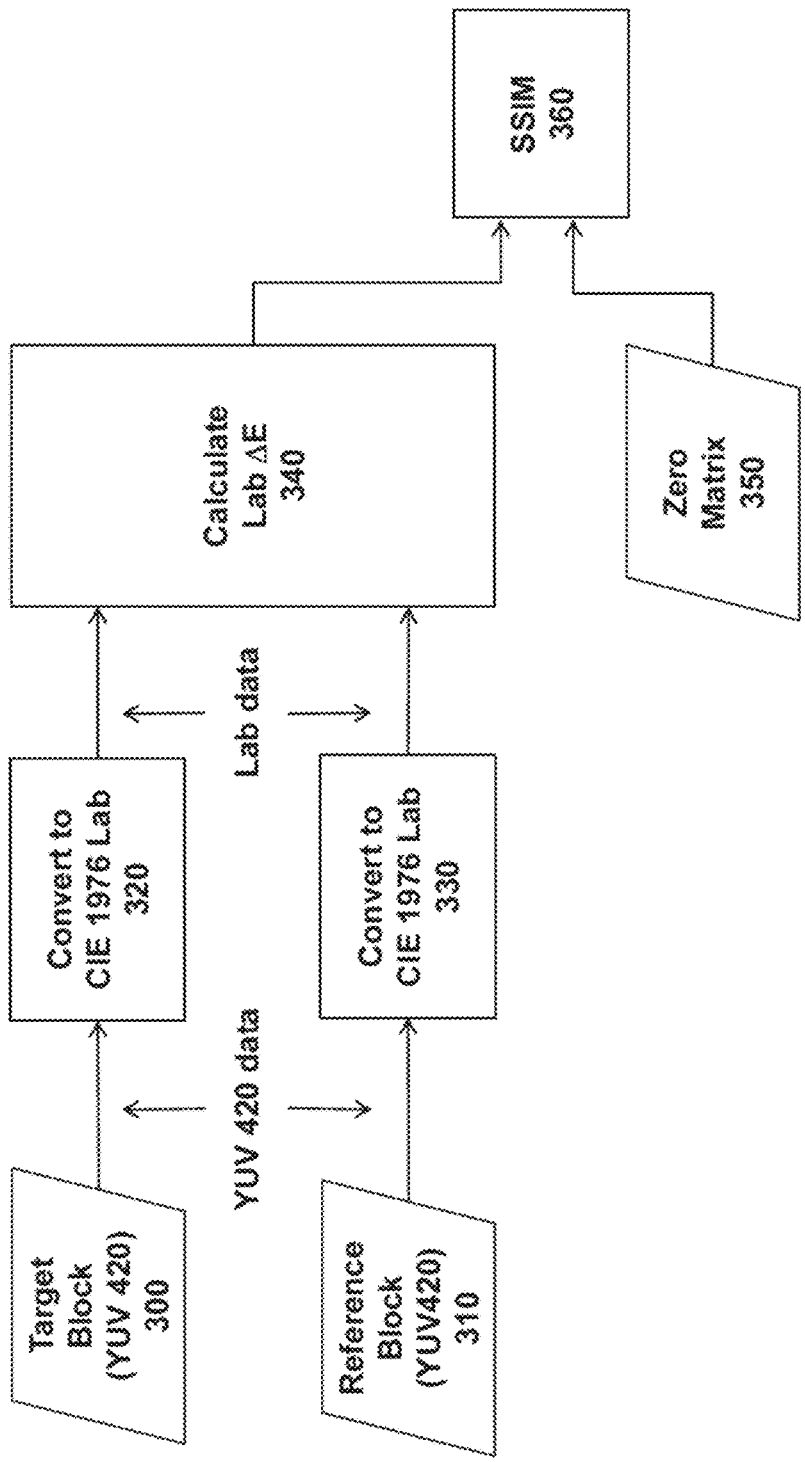
Figure 6: Calculation of SSIM in CIE 1976 Lab colorspace

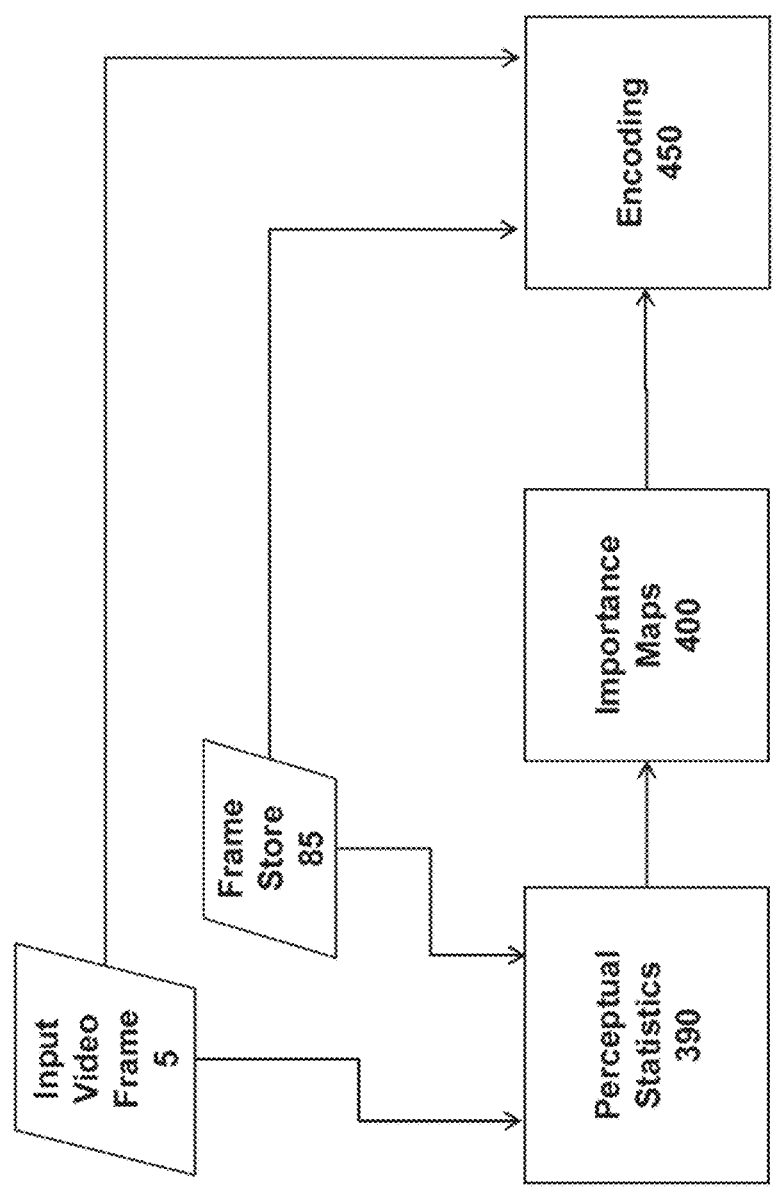
Figure 7: General application of importance maps to video encoding

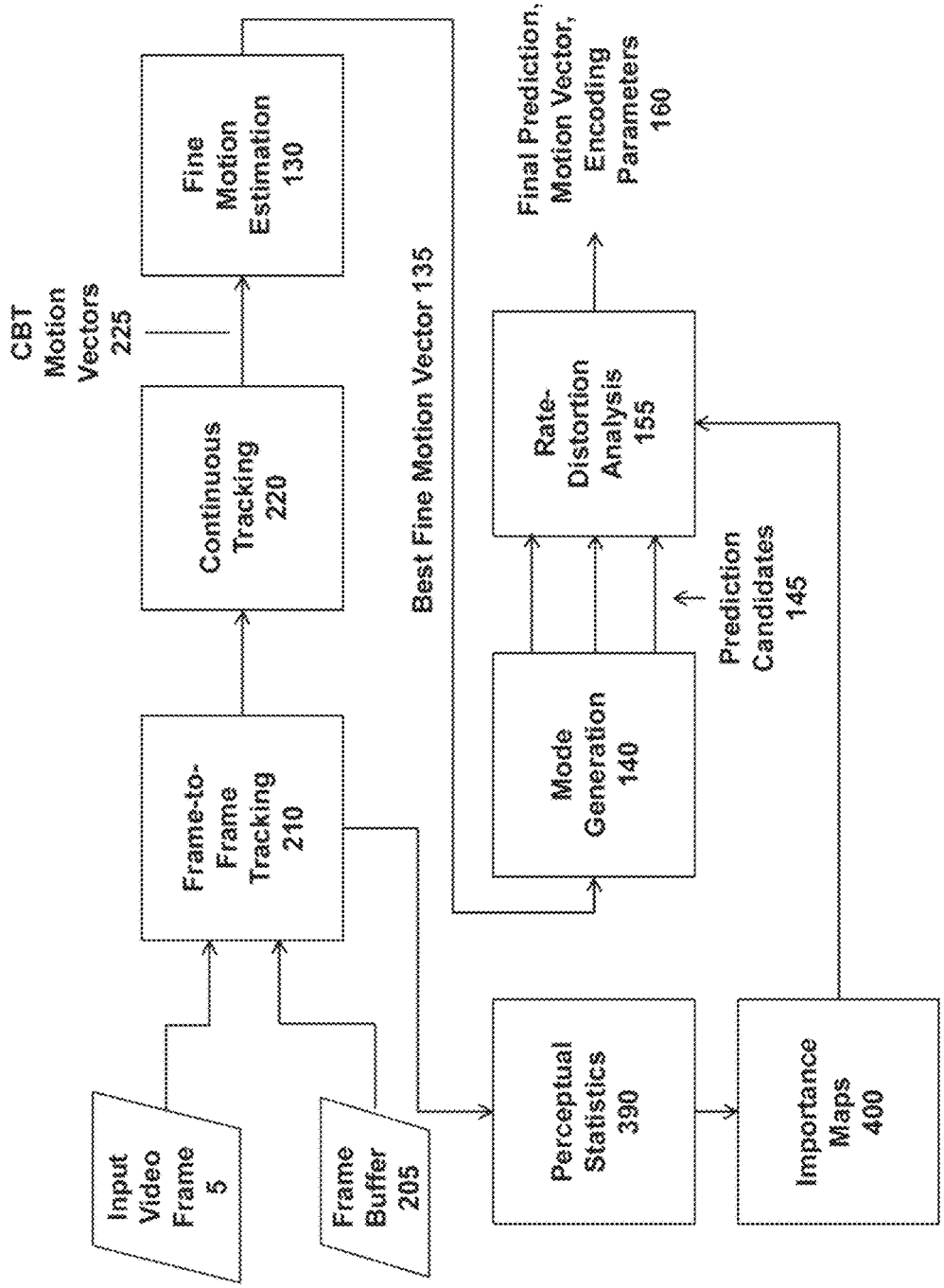
Figure 8A: Application of perceptual statistics to inter-prediction via continuous block tracking

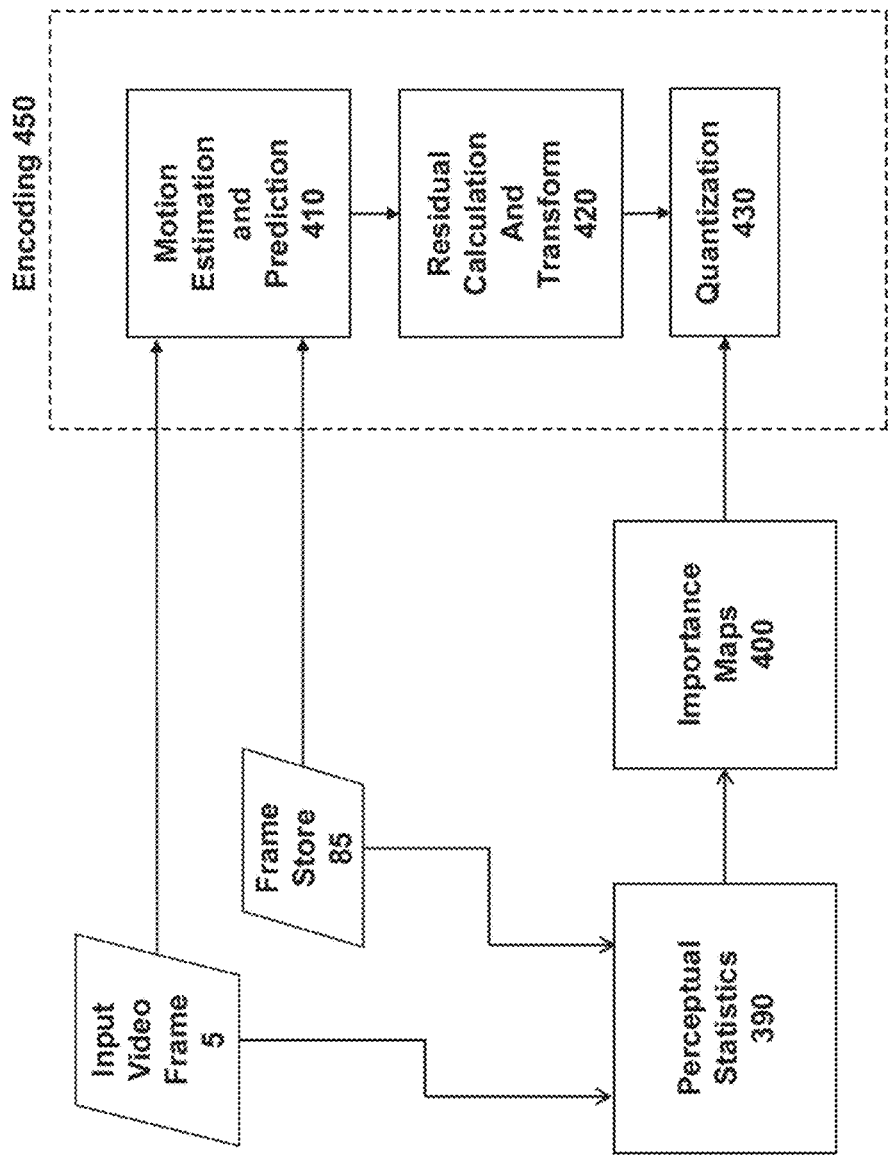
Figure 8B: Application of importance maps to modify quantization in video encoding

PERCEPTUAL OPTIMIZATION FOR MODEL-BASED VIDEO ENCODING

RELATED APPLICATIONS

This application is a continuation-in-part of U.S. application Ser. No. 14/845,067 filed Sep. 3, 2015, which claims the benefit of U.S. Provisional Application No.: 62/158,523 filed on May 7, 2015 and U.S. Provisional Application 62/078,181 filed on Nov. 11, 2014. U.S. application Ser. No. 14/845,067 is a continuation-in-part of U.S. application Ser. No. 14/532,947, filed Nov. 4, 2014, which claims the benefit of U.S. Provisional Application No. 61/950,784, filed Mar. 10, 2014 and U.S. Provisional Application No. 62/049,342, filed Sep. 11, 2014. The entire teachings of the above referenced applications are incorporated herein by reference.

BACKGROUND

Video compression can be considered the process of representing digital video data in a form that uses fewer bits when stored or transmitted. Video encoding can achieve compression by exploiting redundancies in the video data, whether spatial, temporal, or color-space. Video compression processes typically segment the video data into portions, such as groups of frames and groups of pels, to identify areas of redundancy within the video that can be represented with fewer bits than required by the original video data. When these redundancies in the data are exploited, greater compression can be achieved. An encoder can be used to transform the video data into an encoded format, while a decoder can be used to transform encoded video back into a form comparable to the original video data. The implementation of the encoder/decoder is referred to as a codec.

Standard encoders divide a given video frame into non-overlapping coding units or macroblocks (rectangular regions of contiguous pels) for encoding. The macroblocks (herein referred to more generally as "input blocks" or "data blocks") are typically processed in a traversal order of left to right and top to bottom in a video frame. Compression can be achieved when input blocks are predicted and encoded using previously-coded data. The process of encoding input blocks using spatially neighboring samples of previously-coded blocks within the same frame is referred to as intra-prediction. Intra-prediction attempts to exploit spatial redundancies in the data. The encoding of input blocks using similar regions from previously-coded frames, found using a motion estimation process, is referred to as inter-prediction. Inter-prediction attempts to exploit temporal redundancies in the data. The motion estimation process can generate a motion vector that specifies, for example, the location of a matching region in a reference frame relative to an input block that is being encoded. Most motion estimation processes consist of two main steps: initial motion estimation, which provides an first, rough estimate of the motion vector (and corresponding temporal prediction) for a given input block, and fine motion estimation, which performs a local search in the neighborhood of the initial estimate to determine a more precise estimate of the motion vector (and corresponding prediction) for that input block.

The encoder may measure the difference between the data to be encoded and the prediction to generate a residual. The residual can provide the difference between a predicted block and the original input block. The predictions, motion vectors (for inter-prediction), residuals, and related data can be combined with other processes such as a spatial transform, a quantizer, an entropy encoder, and a loop filter to create an efficient encoding of the video data. The residual that has been quantized and transformed can be processed and added back to the prediction, assembled into a decoded frame, and stored in a framestore. Details of such encoding techniques for video will be familiar to a person skilled in the art.

MPEG-2 (H.262) and H.264 (MPEG-4 Part 10, Advanced Video Coding [AVC]), hereafter referred to as MPEG-2 and H.264, respectively, are two codec standards for video compression that achieve high quality video representation at relatively low bitrates. The basic coding units for MPEG-2 and H.264 are 16×16 macroblocks. H.264 is the most recent widely-accepted standard in video compression and is generally thought to be twice as efficient as MPEG-2 at compressing video data.

The basic MPEG standard defines three types of frames (or pictures), based on how the input blocks in the frame are encoded. An I-frame (intra-coded picture) is encoded using only data present in the frame itself and thus consists of only intra-predicted blocks. A P-frame (predicted picture) is encoded via forward prediction, using data from previously-decoded I-frames or P-frames, also known as reference frames. P-frames can contain either intra blocks or (forward-)predicted blocks. A B-frame (bi-predicted picture) is encoded via bi-directional prediction, using data from both previous and subsequent frames. B-frames can contain intra, (forward-)predicted, or bi-predicted blocks.

A particular set of reference frames is termed a Group of Pictures (GOP). The GOP contains only the decoded pels within each reference frame and does not include information as to how the input blocks or frames themselves were originally encoded (I-frame, B-frame, or P-frame). Older video compression standards such as MPEG-2 use one reference frame (in the past) to predict P-frames and two reference frames (one past, one future) to predict B-frames. By contrast, more recent compression standards such as H.264 and HEVC (High Efficiency Video Coding) allow the use of multiple reference frames for P-frame and B-frame prediction. While reference frames are typically temporally adjacent to the current frame, the standards also allow reference frames that are not temporally adjacent.

Conventional inter-prediction is based on block-based motion estimation and compensation (BBMEC). The BBMEC process searches for the best match between the target block (the current input block being encoded) and same-sized regions within previously-decoded reference frames. When such a match is found, the encoder may transmit a motion vector, which serves as a pointer to the best match's position in the reference frame. For computational reasons, the BBMEC search process is limited, both temporally in terms of reference frames searched and spatially in terms of neighboring regions searched. This means that "best possible" matches are not always found, especially with rapidly changing data.

The simplest form of the BBMEC process initializes the motion estimation using a (0, 0) motion vector, meaning that the initial estimate of a target block is the co-located block in the reference frame. Fine motion estimation is then performed by searching in a local neighborhood for the region that best matches (i.e., has lowest error in relation to) the target block. The local search may be performed by exhaustive query of the local neighborhood (termed here full block search) or by any one of several "fast search" methods, such as a diamond or hexagonal search.

An improvement on the BBMEC process that has been present in standard codecs since later versions of MPEG-2 is the enhanced predictive zonal search (EPZS) method [Tourapis, A., 2002, "Enhanced predictive zonal search for single and multiple frame motion estimation," *Proc. SPIE* 4671, *Visual Communications and Image Processing*, pp. 1069-1078]. The EPZS method considers a set of motion vector candidates for the initial estimate of a target block, based on the motion vectors of neighboring blocks that have already been encoded, as well as the motion vectors of the co-located block (and neighbors) in the previous reference frame. The EPZS method hypothesizes that the video's motion vector field has some spatial and temporal redundancy, so it is logical to initialize motion estimation for a target block with motion vectors of neighboring blocks, or with motion vectors from nearby blocks in already-encoded frames. Once the set of initial estimates has been gathered, the EPZS method narrows the set via approximate rate-distortion analysis, after which fine motion estimation is performed.

For any given target block, the encoder may generate multiple inter-predictions to choose from. The predictions may result from multiple prediction processes (e.g., BBMEC, EPZS, or model-based schemes). The predictions may also differ based on the subpartitioning of the target block, where different motion vectors are associated with different subpartitions of the target block and the respective motion vectors each point to a subpartition-sized region in a reference frame. The predictions may also differ based on the reference frames to which the motion vectors point; as noted above, recent compression standards allow the use of multiple reference frames. Selection of the best prediction for a given target block is usually accomplished through rate-distortion optimization, where the best prediction is the one that minimizes the rate-distortion metric $D+\lambda R$, where the distortion D measures the error between the target block and the prediction, while the rate R quantifies the cost (in bits) to encode the prediction and $\lambda$ is a scalar weighting factor.

Historically, model-based compression schemes have also been proposed to avoid the limitations of BBMEC prediction. These model-based compression schemes (the most well-known of which is perhaps the MPEG-4 Part 2 standard) rely on the detection and tracking of objects or features (defined generally as "components of interest") in the video and a method for encoding those features/objects separately from the rest of the video frame. Feature/object detection/tracking occurs independently of the spatial search in standard motion estimation processes, so feature/object tracks can give rise to a different set of predictions than achievable through standard motion estimation.

SUMMARY

Such feature/object-based model-based compression schemes, however, suffer from the challenges associated with segmenting video frames into object vs. non-object (or feature vs. non-feature) regions. First, because objects can be of arbitrary size, their shapes need to be encoded in addition to their texture (color content). Second, the tracking of multiple moving objects can be difficult, and inaccurate tracking causes incorrect segmentation, usually resulting in poor compression performance. A third challenge is that not all video content is composed of objects or features, so there needs to be a fallback encoding scheme when objects/features are not present.

U.S. Patent Application No. 61/950,784, filed Nov. 4, 2014 (herein "the '784 application") presents a model-based compression scheme that avoids the segmentation challenge noted above. The continuous block tracker (CBT) of the '784 application does not detect objects and features, eliminating the need to segment objects and features from the non-object/non-feature background. Instead the CBT tracks all input blocks ("macroblocks") in the video frame as if they are regions of interest by combining frame-to-frame motion estimates into continuous tracks. In so doing, the CBT models motion in the video, achieving the benefits of higher-level modeling of the data to improve inter-prediction while avoiding the challenges of segmentation.

Other model-based compression approaches model the response of the human visual system (HVS) to the content in the video data as importance maps that indicate which parts of a video frame are most noticeable to human perception. Importance maps take on values for each input or data block in a video frame, and the importance map values for any given block may change from frame to frame throughout the video. Generally, importance maps are defined such that higher values indicate more important data blocks.

One type of importance map is the temporal contrast sensitivity function (TCSF) [de Lange, H., 1954, "Relationship between critical flicker frequency and a set of low frequency characteristics of the eye," *J. Opt. Soc. Am.*, 44:380-389], which measures the response of the HVS to temporally periodic stimuli and reveals that certain temporal characteristics in the data are noticeable to human observers. These temporal characteristics are related to the motion in the data, and the TCSF predicts that the most noticeable type of motion in the data is "moderate" motion that corresponds to neither very high nor very low temporal frequencies.

It is important to note that the TCSF requires accurate measurement of the velocities of moving content in the video to generate accurate temporal contrast values. These velocities can be approximated by computing optical flow, which describes the apparent motion of video content due to camera motion and/or object motion. However, most standard video encoders employ motion estimation processes that optimize compression efficiency rather than accurately computing optical flow.

Another type of importance map is based on spatial contrast sensitivity and measures the HVS response to spatial characteristics such as brightness, edges, spatial frequencies, and color. The spatial-contrast sensitivity function (SCSF) [see, e.g., Barten, P., 1999, *Contrast Sensitivity of the Human Eye and Its Effects on Image Quality*, SPIE Press], also known simply as the contrast sensitivity function (CSF), measures spatial contrast that is significant to the HVS and has been applied successfully in the JPEG 2000 image compression standard to reduce image compression artifacts. Objects and features are also typically detected with the aid of spatial contrast measures (e.g., the presence of edges as indicated by spatial frequency gradients). While spatial contrast sensitivity has been studied and exploited in the context of image compression (e.g., the JPEG 2000 codec) and many video compression processes based on object and feature detection have been proposed, temporal contrast sensitivity as represented in the TCSF has not previously been applied to video compression.

Some disclosed inventive embodiments apply importance maps to video compression to enhance the quality of video encoding. In one example embodiment, within a standard video encoding processing stream, temporal frequency is computed by using structural similarity (SSIM) in the colorspace domain to approximate wavelength and the encoder's motion vectors to approximate velocity. Temporal frequency then serves as an input to the temporal contrast sensitivity function (TCSF), which can be computed for every data block to generate a temporal importance map that indicates which regions of the video frame are most noticeable to human observers.

In a further example embodiment, information about the relative quality of the motion vectors generated by the encoder can be computed at different points in the encoding process and then used to generate a true motion vector map that outputs, for each target block, how reliable its motion vector is. The true motion vector map, which takes on values of 0 or 1, can then be used as a mask to refine the TCSF, such that the TCSF is not used for target blocks whose motion vectors are not accurate (i.e., the true motion vector map is 0).

In a further embodiment, spatial complexity maps (SCMs) can be calculated from metrics such as block variance, block luminance, and edge strength to determine the spatial contrast of a given target block relative to its neighbors. In another embodiment, information from the SCMs can be combined with the TCSF to obtain a composite, unified importance map. The combination of spatial and temporal contrast information in the unified importance map effectively balances both aspects of human visual response.

In one example embodiment, the unified importance map (including information from both the TCSF and SCM) is used to weight the distortion part of the standard rate-distortion metric, $D+\lambda R$. This results in a modified rate-distortion optimization that is weighted toward solutions that fit the relative perceptual importance of each target block, either low-distortion solutions when the importance map is closer to its maximum or low-rate solutions when the importance map is closer to its minimum. In an alternative embodiment, either the TCSF or SCM may be used individually for the above purpose.

In another example embodiment, the TCSF (with true motion vector refinement) and SCM can be used to modify the block-level quantization of the encoder. In target blocks where the importance maps take on high values, the quantization parameter is reduced relative to the frame quantization parameter, resulting in higher quality for those blocks. In target blocks where the importance maps take on low values, the quantization parameter is increased relative to the frame quantization parameter, resulting in lower quality for those blocks. In an alternative embodiment, either the TCSF or SCM may be used individually for the above purpose.

While the TCSF can be computed for any encoder that incorporates inter-prediction and generates motion vectors (used by the TCSF to approximate the velocity of the content in the video), application of the TCSF to video compression is most effective within a model-based compression framework such as the continuous block tracker (CBT) of the '784 application that provides accurate determination of which motion vectors are true motion vectors. As noted above, most standard video encoders compute motion vectors that optimize compression efficiency rather than reflecting true motion. By contrast, the CBT provides both motion vectors suitable for high compression efficiency and modeling information that maximizes the effectiveness of the TCSF.

Some example inventive embodiments are structured so that the resulting bitstream is compliant with any video compression standard including, but not limited to, MPEG-2, H.264, and HEVC that employs block-based motion estimation followed by transform, quantization, and entropy encoding of residual signals. The present invention can also be applied to non-standard video encoders that are not block-based, as long as the encoder incorporates inter-prediction and generates motion vectors.

Some example embodiments may include methods and systems of encoding video data, as well as any codecs (encoders/decoders) for implementing the same. A plurality of video frames having non-overlapping target blocks may be processed by an encoder. The plurality of video frames may be encoded by the encoder using importance maps, such that the importance maps may modify the quantization, as well as the encoding quality of each target block to be encoded in each video frame.

The importance maps may be computationally configured using temporal information and spatial information. The importance maps may be computationally configured to indicate which parts of a video frame in the plurality of video frames are most noticeable to human perception. For example, the importance maps may identify: (i) in blocks where the importance maps take on high values, the block quantization parameter (QP) is reduced relative to the frame quantization parameter $QP_{frame}$, resulting in higher quality for those blocks, and (ii) in blocks where the importance maps take on low values, the block quantization parameter is increased relative to the frame quantization parameter $QP_{frame}$, resulting in lower quality for those blocks; and (iii) each reduction or increase in block QP is represented in the importance map as a QP offset.

The spatial information for the importance maps may be provided by a lookup table based on block variance. The lookup table may provide negative spatial QP offsets for block variances lower than 200 and positive spatial QP offsets for block variances above 400. The temporal information for the importance maps may be provided by a computational transformation process (e.g. an algorithm) that determines the encoding importance of each block for inter-prediction in future frames. The blocks of greater importance may be assigned negative temporal QP offsets. The total QP offset for a given block may be equal to the spatial QP offset plus the temporal QP offset, clipped to the maximum and minimum allowable QP values in the frame.

Block variance may be adjusted by edge strength, such that edge strength is calculated for each pixel by taking differences with neighboring pixels. Edge strength may be calculated for each macroblock by averaging the edge strengths of the pixels in the macroblock. Each macroblock may be classified as either a flat macroblock, a clean edge, a complex edge, or a complex macroblock based on its edge strength, it block variance, and the edge strength of neighboring macroblocks. If a macroblock is classified as a clean edge, for example, its block variance is adjusted downward, whereas if a macroblock is classified as a complex edge, its block variance is adjusted upward.

The spatial QP offset of a given macroblock may be set to 0 if its original block variance is greater than 400, while its adjusted block variance (after taking edge strength into account) is less than 200. A positive spatial QP offset for a given macroblock may be reduced by a factor of 2 if the block is identified as either a clean edge or a complex edge.

The minimum allowable QP in a frame, $QP_{min}$, may be determined based on the complexity of the frame data, the tightness of the bit budget, and the frame type. If, for instance, the content is simple (e.g. lacks computational complexity), the bit budget is tight, and the frame is not a reference frame, then $QP_{min}$ is chosen to be close to the frame QP, $QP_{frame}$. If, however, the content is complex (e.g. has computational complexity), the bit budget is slack (i.e., there are plenty of available bits), and the frame is a reference frame, then $QP_{min}$ may be as many as 10 units lower than $QP_{frame}$.

The initial estimate of block QP for each macroblock, $QP_{block-init}$, may be set to a low value (e.g., 28 for I-frames, 30 for P-frames, and 33 for B-frames) if the block variance is less than 60 and is set to $QP_{frame}$ if the block variance is greater than or equal to 60. The final block QP of each macroblock, $QP_{block}$, may be calculated as the sum of $QP_{block-init}$ and the total QP offset of that block. If the calculated $QP_{block}$ is less than $QP_{min}$, then $QP_{block}$ may be clipped (set equal) to $QP_{min}$.

Luminance level matching may be applied by considering an additional intra encoding mode where the encoder has made a skip mode decision. For example, the rate-distortion costs of the intra mode and skip mode may be compared. If the rate-distortion cost of the intra mode is lower than the rate-distortion cost of the skip mode, the intra mode may be chosen instead.

In some embodiments, importance maps may be formed using at least one of: temporal information or spatial information. If both temporal and spatial information are used, the importance map is considered a unified importance map. The importance maps may be configured so that they indicate/identify/represent parts of a video frame in the plurality of video frames that are the most noticeable to human perception. Specifically, in blocks where the importance maps take on high values, the block quantization parameter (QP) is reduced relative to the frame quantization parameter $QP_{frame}$, resulting in higher quality for those blocks; and in target blocks where the importance maps take on low values, the block quantization parameter is increased relative to the frame quantization parameter $QP_{frame}$, resulting in lower quality for those blocks.

The spatial information may be provided by a rule-based spatial complexity map (SCM) in which the initial step is to determine which target blocks in the frame have higher variance than the average block variance in the frame, $var_{frame}$. For such blocks, a QP value may be assigned that is higher than the frame quantization parameter $QP_{frame}$, with the block QP assignment $QP_{block}$ scaled linearly between $QP_{frame}$ and the maximum quantization parameter $QP_{max}$, based on how much higher the block variance $var_{block}$ is than $var_{frame}$.

The temporal information may preferably be provided by a temporal contrast sensitivity function (TCSF) that indicates which target blocks are most temporally noticeable to a human observer and a true motion vector map (TMVM) that indicates which target blocks correspond to foreground data. It should be noted that the TCSF may only be considered valid for those target blocks identified as foreground data.

A high-variance block may have its block QP assignment $QP_{block}$ further refined by the TCSF and TMVM, such that if the TMVM identifies a target block as foreground data and the TCSF has a log contrast sensitivity value less than 0.5 for that block, $QP_{block}$ is raised by 2.

The SCM may include luminance masking, in which target blocks that are either very bright (luminance above 170) or very dark (luminance below 60) have their block quantization parameters $QP_{block}$ adjusted back to $QP_{max}$. The SCM may include dynamic determination of $QP_{max}$ based on the quality level of the encoded video, where quality is measured using an average structural similarity (SSIM) calculation of target blocks in Intra (I) frames, together with the average block variance $var_{frame}$ of such frames; such that when the measured quality is low, the value of $QP_{max}$ is lowered to something closer to $QP_{frame}$.

Very-low-variance blocks may be assigned fixed, low QP values $QP_{block}$ to ensure high-quality encoding in those regions, such that the lower the block variance, the lower the value of $QP_{block}$ (and the higher the quality). The assignment of low QP values $QP_{block}$ for very-low-variance blocks may be fixed first for I-frames and then determined for P-frames and B-frames using the ipratio and pbratio parameters. Blocks that are low-variance but do not qualify as very-low-variance are examined to determine whether quality enhancement is needed for those blocks; in that an initial estimate of the block QP, $QP_{block}$, is calculated by average the QP values of neighboring, already encoded blocks to the left, top-left, right, and top-right of the current block. An estimate of the SSIM of the current block, $SSIM_{est}$, may be calculated from the SSIM values of neighboring, already-encoded blocks to the left, top-left, right, and top-right of the current block. The value of $QP_{block}$ may be lowered by 2 if $SSIM_{est}$ is lower than 0.9.

In some embodiments, the quality enhancement is only applied to those blocks that are identified as foreground data by the TMVM and for which the TCSF has log contrast sensitivity value greater than 0.8. The TMVM may be set to 1 only for foreground data.

In some embodiments, the temporal frequency of the TCSF is computed by using SSIM in the colorspace domain between the target block and its reference block to approximate wavelength and by using motion vector magnitudes and the framerate to approximate velocity.

The TCSF may be calculated over multiple frames, such that the TCSF for the current frame is a weighted average of the TCSF maps over recent frames, with more recent frames receiving higher weighting.

The foreground data may be identified by computing the difference between the encoder motion vector for a given target block and the global motion vector for that block, such that blocks with sufficiently large differences are determined to be foreground data.

For data blocks that are identified as foreground data, the encoder motion vector may be subtracted from the global motion vector to obtain a differential motion vector, and it is the magnitude of the differential motion vector that is used in calculating the temporal frequency of the TCSF.

Computer-based methods, codecs (encoders/decoders), and other computer systems and apparatus for processing video data may embody the foregoing principles of the present invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, with emphasis instead placed on illustrating embodiments of the present invention.

FIG. 1 is a block diagram depicting a standard encoder configuration.

FIG. 2 is a block diagram depicting the steps involved in inter-prediction for general encoders.

FIG. 3 is a block diagram depicting the steps involved in initial motion estimation via continuous block tracking.

FIG. 4 is a block diagram depicting unified motion estimation via a combination of continuous block tracking and enhanced predictive zonal search.

FIG. 5 is a plot depicting a recent measurement of the temporal contrast sensitivity function by Wooten et al [2010].

FIG. 6 is a block diagram depicting the calculation of structural similarity (SSIM) in CIE 1976 Lab colorspace, according to an embodiment of the invention.

FIG. 7 is a block diagram depicting the general application of perceptual statistics to improve the perceptual quality of video encodings, according to an embodiment of the invention.

FIG. 8A is a block diagram depicting the use of perceptual statistics to modify inter-prediction via continuous block tracking to improve the perceptual quality of video encodings, according to an embodiment of the invention.

FIG. 8B is a block diagram depicting an example process of encoding using importance maps to modify block quantization.

DETAILED DESCRIPTION

Figure 9A:
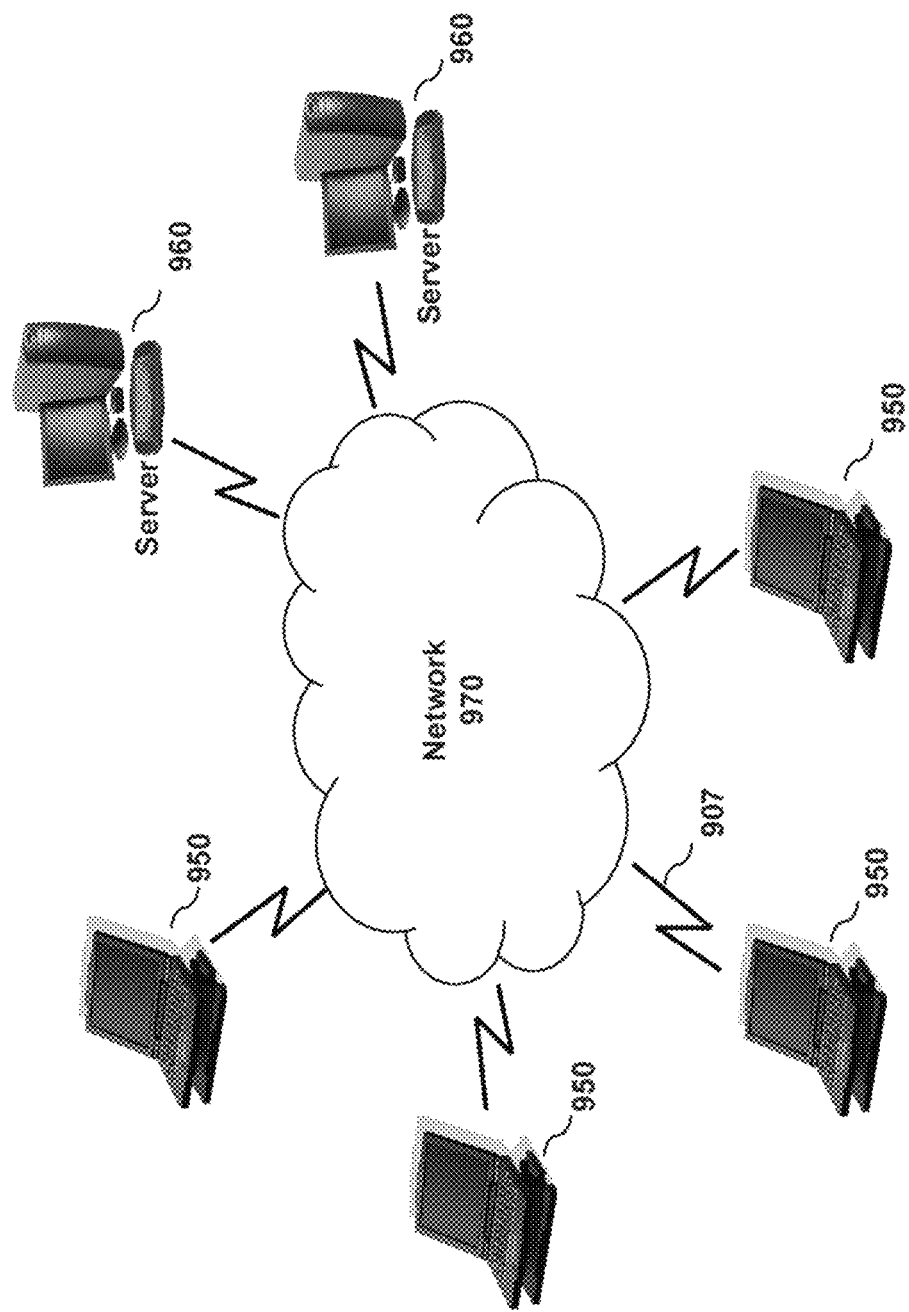
FIG. 9A is a schematic diagram of a computer network environment in which embodiments are deployed.

The teachings of all patents, published applications and references cited herein are incorporated by reference in their entirety. A description of example embodiments of the invention follows.

The invention can be applied to various standard encodings. In the following, unless otherwise noted, the terms "conventional" and "standard" (sometimes used together with "compression," "codecs," "encodings," or "encoders") can refer to MPEG-2, MPEG-4, H.264, or HEVC. "Input blocks" are referred to without loss of generality as the basic coding unit of the encoder and may also sometimes be referred to interchangeably as "data blocks" or "macroblocks." The current input block being encoded is referred to as a "target block."

Video Encoding and Inter-Prediction Via Continuous Block Tracking

The encoding process may convert video data into a compressed, or encoded, format. Likewise, the decompression or decoding process may convert compressed video back into an uncompressed, or raw, format. The video compression and decompression processes may be implemented as an encoder/decoder pair commonly referred to as a codec.

FIG. 1 is a block diagram of a standard transform-based, motion-compensated encoder. The encoder in FIG. 1 may be implemented in a software or hardware environment, or combination thereof. The encoder may include any combination of components, including, but not limited to, a motion estimation module 15 that feeds into an inter-prediction module 20, an intra-prediction module 30, a transform and quantization module 60, an inverse transform and quantization module 70, an in-loop filter 80, a frame store 85, and an entropy encoding module 90. For a given input video block 10 ("input block" for short, or macroblock or "data block"), the purpose of the prediction modules (both inter-prediction and intra-prediction) is to generate the best predicted signal 40 for the input block. The predicted signal 40 is subtracted from the input block 10 to create a prediction residual 50 that undergoes transform and quantization 60. The quantized coefficients 65 of the residual then get passed to the entropy encoding module 90 for encoding into the compressed bitstream. The quantized coefficients 65 also pass through the inverse transform and quantization module 70, and the resulting signal (an approximation of the prediction residual) gets added back to the predicted signal 40 to create a reconstructed signal 75 for the input block 10. The reconstructed signal 75 may be passed through an in-loop filter 80 such as a deblocking filter, and the (possibly filtered) reconstructed signal becomes part of the frame store 85 that aids prediction of future input blocks. The function of each of the components of the encoder shown in FIG. 1 is well known to one of ordinary skill in the art.

FIG. 2 depicts the steps in standard inter-prediction (30 in FIG. 1), where the goal is to encode new data using previously-decoded data from earlier frames, taking advantage of temporal redundancy in the data. In inter-prediction, an input block 10 from the frame currently being encoded (also called the target frame) is "predicted" from a region of the same size within a previously-decoded reference frame, stored in the frame store 85 from FIG. 1. The two-component vector indicating the (x, y) displacement between the location of the input block in the frame being encoded and the location of its matching region in the reference frame is termed a motion vector. The process of motion estimation thus involves determining the motion vector that best links an input block to be encoded with its matching region in a reference frame.

Most inter-prediction processes begin with initial motion estimation (110 in FIG. 2), which generates one or more rough estimates of "good" motion vectors 115 for a given input block. This is followed by an optional motion vector candidate filtering step 120, where multiple motion vector candidates can be reduced to a single candidate using an approximate rate-distortion metric. In rate-distortion analysis, the best motion vector candidate (prediction) is chosen as the one that minimizes the rate-distortion metric $D+\lambda R$, where the distortion D measures the error between the input block and its matching region, while the rate R quantifies the cost (in bits) to encode the prediction and $\lambda$ is a scalar weighting factor. The actual rate cost contains two components: texture bits, the number of bits needed to encode the quantized transform coefficients of the residual signal (the input block minus the prediction), and motion vector bits, the number of bits needed to encode the motion vector. Note that motion vectors are usually encoded differentially, relative to already-encoded motion vectors. In the early stages of the encoder, texture bits are not available, so the rate portion of the rate-distortion metric is approximated by the motion vector bits, which in turn are approximated as a motion vector penalty factor dependent on the magnitude of the differential motion vector. In the motion vector candidate filtering step 120, then, the approximate rate-distortion metric is used to select either a single "best" initial motion vector or a smaller set of "best" initial motion vectors 125. The initial motion vectors 125 are then refined with fine motion estimation 130, which performs a local search in the neighborhood of each initial estimate to determine a more precise estimate of the motion vector (and corresponding prediction) for the input block. The local search is usually followed by subpixel refinement, in which integer-valued motion vectors are refined to half-pixel or quarter-pixel precision via interpolation. The fine motion estimation block 130 produces a set of refined motion vectors 135.

Next, for a given fine motion vector 135, a mode generation module 140 generates a set of candidate predictions 145 based on the possible encoding modes of the encoder. These modes vary depending on the codec. Different encoding modes may account for (but are not limited to) interlaced vs. progressive (field vs. frame) motion estimation, direction of the reference frame (forward-predicted, backward-predicted, bi-predicted), index of the reference frame (for codecs such as H.264 and HEVC that allow multiple reference frames), inter-prediction vs. intra-prediction (certain scenarios allowing reversion to intra-prediction when no good inter-predictions exist), different quantization parameters, and various subpartitions of the input block. The full set of prediction candidates 145 undergoes "final" rate-distortion analysis 150 to determine the best single candidate. In "final" rate-distortion analysis, a precise rate-distortion metric D+λR is used, computing the prediction error D for the distortion portion (usually calculated as sum of squared errors [SSE]) and the actual encoding bits R (from the entropy encoding 90 in FIG. 1) for the rate portion. The final prediction 160 (or 40 in FIG. 1) is the one that has lowest rate-distortion score D+λR among all the candidates, and this final prediction is passed to the subsequent steps of the encoder, along with its motion vector and other encoding parameters.

FIG. 3 depicts how initial motion estimation can be performed during inter-prediction via continuous block tracking (CBT). CBT is useful when there is a gap of greater than one frame between the target frame and the reference frame from which temporal predictions are derived. For MPEG-2, a typical GOP structure of IBBPBBP (consisting of intra-predicted I-frames, bi-predicted B-frames, and forward-predicted P-frames) allows reference frames as many as three frames away from the current frame, as B-frames cannot act as reference frames in MPEG-2. In H.264 and HEVC, which allow multiple reference frames for each frame to be encoded, the same GOP structure allows reference frames to be located six or more frames away from the current frame. For longer GOP structures (e.g., seven B-frames in-between each P-frame), reference frames can be located even further from the target frame. When there is a greater-than-one-frame gap between the current frame and the reference frame, continuous tracking enables the encoder to capture motion in the data in a way that standard temporal prediction methods cannot, allowing CBT to produce superior temporal predictions.

The first step in CBT is to perform frame-to-frame tracking (210 in FIG. 3). For each input block 10 in a frame, motion vectors are calculated in both the backward direction to the previous frame in the frame buffer 205 and the forward direction to the next frame in the frame buffer. In one embodiment, frame-to-frame tracking operates on frames from the original source video, not reconstructed reference frames. This is advantageous because source video frames are not corrupted by quantization and other coding artifacts, so tracking based on source video frames more accurately represents the true motion field in the video. Frame-to-frame tracking may be carried out using either conventional block-based motion estimation (BBME) or hierarchical motion estimation (HME).

The result of frame-to-frame tracking is a set of frame-to-frame motion vectors 215 that signify, for each input block in a frame, the best matching region in the most recent frame in the frame buffer 205, and, for each block of the most recent frame in the frame buffer 205, the best matching region in the current frame. Continuous tracking 220 then aggregates available frame-to-frame tracking information to create continuous tracks across multiple reference frames for each input block. Details of how to perform continuous tracking are found in the '784 application, which is incorporated by reference herein in its entirety. The output of continuous tracking 220 are the continuous block tracking (CBT) motion vectors 225 that track all input blocks in the current frame being encoded to their matching regions in past reference frames. The CBT motion vectors are the initial motion vectors (125 in FIG. 2) for the CBT, and they can be refined with fine motion estimation (130 in FIG. 2) as noted above.

FIG. 4 depicts how the CBT can be combined with the EPZS method to create a unified motion estimation process, according to an embodiment of the invention. In FIG. 4, CBT generates its motion vectors through frame-to-frame tracking 210 and continuous tracking 220 for initial motion estimation 110, followed by local search and subpixel refinement 250 for fine motion estimation 130. EPZS generates its initial motion vectors through a candidate generation module 230, followed by a candidate filtering module 240, with the filtering carried out via approximate rate-distortion analysis as detailed above. This is followed by fine motion estimation 130 via local search and subpixel refinement 260. The resulting CBT motion vector 255 and EPZS motion vector 265 are both passed forward to the remaining inter-prediction steps (mode generation 140 and final rate-distortion analysis 150 in FIG. 2) to determine the overall "best" inter-prediction.

In an alternative embodiment, the CBT and EPZS motion vector candidates 255 and 265 in FIG. 4 may be supplemented by additional candidates, including (but not limited to) random motion vectors, the (0, 0) motion vector, and the so-called "median predictor." The random motion vector may have fine motion estimation 130 applied to it to find the best candidate in its local neighborhood. The (0, 0) motion vector is one of the initial candidates in EPZS, but it is not always selected after EPZS candidate filtering (240 in FIG. 4), and even if it selected after candidate filtering, fine motion estimation 130 may result in a motion vector other than (0, 0). Explicitly including the (0, 0) motion vector (with no accompanying fine motion estimation) as a candidate for final rate-distortion analysis ensures that at least one low-magnitude, "low-motion" candidate is considered. Similarly, the "median predictor" is also one of the initial candidates in EPZS, but it is also not always selected after EPZS candidate filtering (240 in FIG. 4). The median predictor is defined as the median of the motion vectors previously calculated in the data blocks to the left, top, and top right of the data block currently being encoded. Explicitly including the median predictor (with no accompanying fine motion estimation) as a candidate for final rate-distortion analysis can be especially beneficial for encoding spatially homogeneous ("flat") regions of the video frame. In this alternative embodiment, then, five or more motion vector candidates may be passed forward to the remaining inter-prediction steps (mode generation 140 and final rate-distortion analysis 150 in FIG. 2), including (but not limited to) a CBT-derived motion vector, an EPZS-derived motion vector, a motion vector derived from a random motion vector, the (0, 0) motion vector, and the median predictor.

Computation of Importance Maps for Video Encoding

Perceptual statistics may be used to compute importance maps that indicate which regions of a video frame are important to the human visual system (HVS).

One example of a perceptual statistic is the so-called temporal contrast sensitivity function (TCSF), which models the response of the human visual system (HVS) to temporally periodic stimuli. As noted in the Background section above, the concept of the TCSF has been around since the 1950s (when it was introduced as a "temporal modulation transfer function"), but it has not been applied to video compression before. FIG. 5 shows a recent measurement of the TCSF [Wooten, B. et al., 2010, "A practical method of measuring the temporal contrast sensitivity function," *Biomedical Optical Express*, 1(1):47-58], displaying the log of the temporal contrast sensitivity as a function of the log of frequency. The measured data points (the circles in FIG. 5) are fit with a $3^{rd}$-degree polynomial (the solid line in FIG. 5), which is then used for all TCSF calculations below. The TCSF predicts that the highest response of the human visual system (HVS) is for moderate frequencies, while HVS response falls off slightly for low frequencies and rapidly for high frequencies.

Application of the TCSF to video compression requires a method of calculating temporal frequency, which is the input to the TCSF (horizontal axis in FIG. 5). One way of calculating frequency, according to an embodiment of the invention, is described in the following. Frequency f is given by $f=v/\lambda$, where v is velocity and $\lambda$ is wavelength. In one embodiment, the velocity v (in units of pixels/s) associated with the content of any data block can be calculated from the magnitude of the motion vectors generated by the encoder (e.g., 135 in FIG. 2, 215 or 225 in FIG. 3, or 255 or 265 in FIG. 4) as v=|MV|*framerate/N, where |MV| is the magnitude of the motion vector associated with the data block, framerate is the number of frames per second at which the video has been generated, and N is the number of frames between the reference frame pointed to by the motion vector and the current frame.

A suitable approximation for the wavelength $\lambda$ can be derived from a computation of structural similarity (SSIM) [Wang, Z. et al., 2004, "Image quality assessment: From error visibility to structural similarity," *IEEE Trans. on Image Processing*, 13(4):600-612], computed in CIE 1976 Lab colorspace [www://en.wikipedia.org/wiki/Lab_color_space]. Computation of SSIM in the Lab colorspace is described in FIG. 6. SSIM is computed between a target block 300 (the current data block to be encoded) and the reference block 310 to which its motion vector points. The video data processed by encoder is usually represented in a standard space such as YUV 420, so the next step is to convert both the target block (320) and the reference block (330) into CIE 1976 Lab space, using any of the methods commonly found in the literature. Next, the error $\Delta E$ (340) between the target block and the reference block in Lab space is computed as $\Delta E=\sqrt{(L_T-L_R)^2+(a_T-a_R)^2+(b_T-b_R)^2}$, where the T subscript stands for "target block" and the R subscript stands for "reference block." Finally, the SSIM 360 between the error $\Delta E$ and the zero matrix of the same dimension is computed to serve as a measure of the colorspace variation of the data. SSIM as originally defined takes on values between −1 and 1, with values of 1 indicating perfect similarity (no spatial distinction). For the purpose of converting SSIM to wavelength $\lambda$, one can use spatial dissimilarity DSSIM=(1−SSIM)/2, which takes on values between 0 and 1, where 0 corresponds to small wavelengths (maximum spatial similarity) and 1 corresponds to large wavelengths (minimum spatial similarity). To convert SSIM to units of pixels, one can multiply the value of SSIM to the number of pixels in the block for which it is calculated. In one embodiment, the SSIM block size is 8×8, so the DSSIM value is multiplied by 64. The final calculation for frequency is thus given by f=|MV|*framerate/[N*64*(1−SSIM)/2].

Once the frequency is calculated for a given target block, the TCSF value for that block can be determined from the curve fit (solid line) in FIG. 5. The TCSF takes on values between 0 and 1.08 in log 10 scale or between 1 and 11.97 on an absolute scale. With different blocks in a frame taking on different TCSF values, the aggregate set of TCSF values over all the blocks in a frame forms an importance map, with high values indicating blocks that are perceptually important from a temporal contrast perspective and low values indicating blocks that are perceptually unimportant.

In a further embodiment, the values of the TCSF from recent frames may be averaged for each data block to prevent the TCSF-based importance map from fluctuating too much from frame to frame. For example, one such calculation of the average TCSF, $TCSF_{avg}$, might be $TCSF_{avg}=0.7 \cdot TCSF_{cur}+0.3 \cdot TCSF_{prev}$, where $TCSF_{cur}$ is the TCSF value from the current frame and $TCSF_{prev}$ is the TCSF value from the most recently encoded previous frame. The TCSF calculation is more robust when averaged in this way.

In a further embodiment, information about the relative quality of the motion vectors generated by the encoder can be computed at different points in the encoding process and then used to generate a true motion vector map (TMVM) that outputs, for each data block, how reliable its motion vector is. The true motion vector map, which takes on values of 0 or 1, can then be used as a mask to refine the TCSF, such that the TCSF is not used for data blocks whose motion vectors are not accurate (i.e., whose TMVM values are 0).

In one embodiment, motion vector accuracy can be determined by estimating a global motion model for a given video frame, applying the motion model to each of the data blocks in the frame to determine a global motion vector for each data block, and then comparing the global motion vector with the encoder's motion vector for that data block. Global motion may be estimated from the aggregate set of encoding motion vectors from the frame, fitted to either a six-parameter or eight-parameter affine motion model. If the global motion vector and encoder motion vector for a given data block are the same (or similar), the encoder motion vector is deemed accurate (and TMVM=1 for that data block). If the two vectors are not the same, one can compare their prediction errors (measured in terms of sum of square error [SSE] or sum of absolute difference [SAD]). If one of the errors is low and the other is high, the motion vector whose error is low is used for encoding and deemed accurate (TMVM=1).

In an alternative embodiment, the magnitude of the difference between the global motion vector and encoder motion vector for a given data block is used to identify that the data block is foreground data, meaning that the content in the data block is moving differently than the rest of the frame (the background). In this embodiment, the TMVM is set to 1 and the TCSF is applied—only for foreground data. In a further embodiment, for data blocks that are identified as foreground data, the encoder motion vector is subtracted from the global motion vector to obtain a differential motion vector, and it is the magnitude of the differential motion vector (not the encoder motion vector) that is used to calculate frequency for the TCSF (see the expression above, substituting |DMV| for |MV|, where DMV=differential motion vector).

In another embodiment, motion vector symmetry may be used to refine the TMVM. Motion vector symmetry [Bartels, C. and de Haan, G., 2009, "Temporal symmetry constraints in block matching," *Proc. IEEE $13^{th}$ Intl. Symposium on Consumer Electronics*, pp. 749-752] is defined as the relative similarity of pairs of counterpart motion vectors when the temporal direction of the motion estimation is switched, is a measure of the quality of calculated motion vectors (the higher the symmetry, the better the motion vector quality). The "symmetry error vector" is defined as the difference between the motion vector obtained through forward-direction motion estimation and the motion vector obtained through backward-direction motion estimation. Low motion vector symmetry (a large symmetry error vector) is often an indicator of the presence of complex phenomena such as occlusions (one object moving in front of another, thus either covering or revealing the background object), motion of objects on or off the video frame, and illumination changes, all of which make it difficult to derive accurate motion vectors.

In one embodiment, low symmetry is declared when the symmetry error vector is larger in magnitude than half the extent of the data block being encoded (e.g., larger in magnitude than an (8, 8) vector for a 16×16 macroblock). In another embodiment, low symmetry is declared when the symmetry error vector is larger in magnitude than a threshold based on motion vector statistics derived during the tracking process, such as the mean motion vector magnitude plus a multiple of the standard deviation of the motion vector magnitude in the current frame or some combination of recent frames. In one embodiment, data blocks whose motion vectors have low symmetry as defined above are automatically assigned a TMVM value of 0, while other data blocks retain their previous TMVM value from comparison of the global motion vector with the encoder motion vector.

Blocks that are flat, while having high spatial contrast sensitivity, tend to give rise to unreliable motion vectors because of the well-known aperture problem (see http://en.wikipedia.org/wiki/Motion_perception#The_aperture_problem) in calculating motion vectors. Flat blocks may be detected, for example, using an edge detection process (where a flat block would be declared if no edges are detected in a data block) or by comparing the variance of a data block to a threshold (low variance less than the threshold would indicate a flat block). In one embodiment, block flatness may be used to modify the TMVM calculated as above. For example, a block may be reassigned a TMVM value of 0 if it is detected as a flat block.

In one embodiment, the TMVM may be used as a mask to refine the TCSF, which depends on having reliable motion vectors. Since the TMVM has values of 0 or 1, block-by-block multiplication of the TMVM value for a block with the TCSF value for that block has the effect of masking the TCSF. For blocks where the TMVM value is 0, the TCSF is "turned off," since the motion vector the TCSF relies on for its calculation is unreliable. For blocks where the TMVM value is 1, the TCSF calculation is considered reliable and used with confidence in any of the ways described above.

In another set of embodiments, spatial contrast maps can be generated instead of, or in addition to, the temporal contrast map (the TCSF as described above).

In the present invention, simple metrics are used to measure spatial contrast, the opposite of which is termed here "spatial complexity." In one embodiment, block variance, measured for both the luma and chroma components of the data, is used to measure the spatial complexity of a given input block. If an input block has high variance, it is thought to be spatially complex and less noticeable to the HVS, and thus it has low spatial contrast.

In another embodiment, block luminance, measured for the luma component of the data, is used to refine the variance measurement of spatial complexity. If an input block has low variance (low spatial complexity, high spatial contrast) but is either very bright or very dark, the block is automatically considered to have low spatial contrast, overriding its previously-measured high spatial contrast. The reason for this is that very dark and very bright regions are not noticeable to the HVS. The luma thresholds for classifying a block as very bright or very dark are application specific, but typical values for 8-bit video are "above 170" for very bright and "below 60" for very dark.

In another embodiment, edge strength may be calculated on a pixel-by-pixel basis by taking pixel differences between a given pixel and its neighboring pixels. Macroblocks may be classified based on their edge strength, their block variance, and the edge strengths of neighboring macroblocks as either flat macroblocks, clean edges, complex edges, or complex macroblocks. This classification may then be used to adjust the block variance of the macroblock either upward (less significance) for complex edges or downward (greater significance) for clean edges.

Block variance, modified by block luminance and edge strength as described above, may be calculated for all the input blocks of a video frame to form a spatial contrast map (SCM) that indicates regions of high and low noticeability to the HVS in terms of spatial contrast.

In one embodiment, the SCM can be combined with the TCSF (refined by the TMVM) to form a unified importance map. The unified map may be formed, for example, by block-by-block multiplication of the SCM value for a block with the TCSF value for that block, with both the SCM and TCSF appropriately normalized. In another embodiment, the SCM may be used in place of the TCSF. In another embodiment, the SCM may be used to refine the TCSF. For example, in a block of high complexity, the SCM value may override the TCSF value for that block, whereas in a block of low complexity, the TCSF value for that block may be used directly.

Application of Importance Maps for Video Encoding

Importance maps as described above may be applied to the video encoding process to enhance the quality of encoded bitstreams, either for general encoders (FIG. 2) or for the CBT encoder (FIG. 3).

FIG. 7 depicts the general application of importance maps to video encoding. The input video frame 5 and frame store 85 are used to generate perceptual statistics 390 that are then applied to form importance maps 400 as described above, the TCSF (refined by the TMVM) and/or the SCM. The perceptual statistics 390 may include (but are not limited to) motion vector magnitudes, block variance, block luminance, edge detection, and global motion model parameters. The input video frame 5 and frame store 85 are also inputted as usual to the encoding of the video frame in 450, which includes the usual encoding steps (in FIG. 2, motion estimation 15, inter-prediction 20, intra-prediction 30, transform and quantization 60, and entropy encoding 90). In FIG. 7, however, the encoding 450 is enhanced by the importance maps 400, as described below.

FIG. 8A depicts the specific application of importance maps to enhance video encoding using the CBT. FIG. 8A shows initial motion estimation (110 in FIG. 2) via the frame-to-frame tracking 210 and continuous tracking 220 steps from CBT. Fine motion estimation 130 is then applied to the global CBT motion vectors 225, with the same fine motion estimation steps of local search and subpixel refinement (250 in FIG. 4). This is again followed by a mode generation module 140 that generates a set of candidate predictions 145 based on the possible encoding modes of the encoder. As in FIG. 4, EPZS and other non-model-based candidates such as the (0, 0) motion vector and the median predictor may also be generated in parallel as part of a unified motion estimation framework (these other candidates are not shown in FIG. 8A to simplify the diagram). Returning to FIG. 8A, the full set of prediction candidates 145, including all encoding modes for CBT candidates and possibly all encoding modes for other, non-model-based candidates, again undergoes "final" rate-distortion analysis 155 to determine the best single candidate. In "final" rate-distortion analysis, a precise rate-distortion metric D+λR is used, computing the prediction error D for the distortion portion and the actual encoding bits R (from the entropy encoding 90 in FIG. 1) for the rate portion. The final prediction 160 (or 40 in FIG. 1) is passed to the subsequent steps of the encoder, along with its motion vector and other encoding parameters.

In FIG. 8A, perceptual statistics 390 can be calculated from the motion vectors derived from frame-to-frame motion tracking 210 and then applied to form importance maps 400 as described above, which are then inputted into the final rate-distortion analysis 155. Again, the perceptual statistics 390 may include (but are not limited to) motion vector magnitudes, block variance, block luminance, edge detection, and global motion model parameters.

In one embodiment, importance maps are used to modify the rate-distortion optimization criterion accordingly. In a standard encoder (see FIG. 2), the full set of prediction candidates 145 for a given input block 10 undergoes "final" rate-distortion analysis 150 to determine the best single candidate. In "final" rate-distortion analysis, a precise rate-distortion metric D+λR is used, computing the prediction error D for the distortion portion and the actual encoding bits R (from the entropy encoding 90 in FIG. 1) for the rate portion. The candidate with the lowest score for the rate-distortion metric D+λR becomes the final prediction 160 for the given input block 10. In one embodiment of the invention, for the perceptually-optimized encoders of FIG. 7 or 8, the importance map IM is calculated in 400 and the final rate-distortion analysis 155 uses a modified rate-distortion metric D·IM+λR. In the modified rate-distortion metric, the IM value for a given input block multiplies the distortion term, assigning more importance to low-distortion solutions the higher the IM value is, since a high IM value indicates that the corresponding input block is perceptually important. The importance map may include the TCSF (possibly refined by the TMVM), the SCM, or a composite of both.

In a further embodiment to the above, the distortion D in the rate distortion metric may be computed as a weighted sum of SSE (sum of squared errors, the "standard" method calculating distortion) and SSIM, calculated in YUV space. The weighting γ can be computed adaptively so that the average SSIM value over the first few (or most recent few) frames of the video, $SSIM_{avg}$, equals the average SSE value over the first few (or most recent few) frames of the video, SSEavg: $\gamma \cdot SSIM_{avg} = SSE_{avg}$. For each input block, the modified rate-distortion metric would then be (SSE+γ·SSIM)·IM+2λR, where the multiple of 2 in front of the λR term accounts for the fact that there are two distortion terms. The inclusion of SSIM in the distortion measurements provides further accounting for HVS perception in the rate-distortion optimization, as SSIM accounts for structural information in the data.

In another set of embodiments, importance maps (e.g., the TCSF with TMVM refinement and the SCM) may be used to modify the block quantization of the encoder in addition to (or instead of) modifying the rate-distortion optimization. Quantization controls the relative quality at which a given data block is encoded; highly-quantized data results in poorer quality encoded output, while less-quantized data results in higher quality encoded output. The amount of quantization is controlled by a quantization parameter, QP. Standard encoders assign different QP values $QP_{frame}$ to different frame types, with I-frames being encoded with the smallest QP (highest quality), B-frames being encoded with the highest QP (lowest quality), and P-frames being encoded with an intermediate QP (intermediate quality).

The above technique then represents a method of encoding a plurality of video frames having non-overlapping target blocks, by using importance maps to modify the quantization (and thus affecting the encoding quality) of each target block in each video frame. The importance maps may be configured using temporal information (the TCSF with TMVM refinement), spatial information, or a combination of the two (i.e., a unified importance map). Because the importance maps indicate which parts of each video frame are most noticeable to human perception, the importance map values should modify the QP for each target block as follows: (i) for blocks where the importance maps take on high values, the block QP is reduced relative to $QP_{frame}$, resulting in higher quality for those blocks; (ii) for blocks where the importance maps take on low values, the block QP is increased relative to the frame quantization parameter $QP_{frame}$, resulting in lower quality for those blocks.

FIG. 8B shows an example process for using importance maps 400 to modify quantization during encoding. At 400, importance maps may be configured/created using temporal information and/or spatial information derived from perceptual statistics 390. Temporal information, for instance, may be provided by a temporal contrast sensitivity function (TCSF) that indicates which target blocks are most temporally noticeable to a human observer and a true motion vector map (TMVM) that indicates which target blocks correspond to foreground data, with the TCSF only considered valid for those target blocks identified as foreground data. Spatial information, for instance, may be provided by a rule-based spatial complexity map (SCM).

The importance maps 400 are then used to modify the quantization step 430 within the encoding 450, as described above. In blocks where the importance maps take on high values, the block quantization parameter (QP) is reduced relative to the frame quantization parameter $QP_{frame}$, resulting in higher encoding quality for those blocks. In blocks where the importance maps take on low values, the block quantization parameter is increased relative to the frame quantization parameter $QP_{frame}$, resulting in lower encoding quality for those blocks. By using the information from the importance maps, quantization may be modified in a way that improves the encoding quality of each target block to be encoded in each of the video frames.

In one embodiment, the TCSF map for a given frame can be used to adjust the frame QP on a block-by-block basis. One method of calculating the block QP, $QP_{block}$, is to relate the adjustment to the full TCSF map in the frame, following the method of [Li, Z. et al, 2011, "Visual attention guided bit allocation in video compression, J. of Image and Vision Computing, 29(1):1-14]. The resulting equation is given by $QP_{block} = [TCSF_{frame}/(TCSF_{block} \times M)] \cdot QP_{frame}$, where $TCSF_{frame}$ is the sum of TCSF values for all blocks in the frame, $TCSF_{block}$ is the TCSF value for the given block, $QP_{frame}$ is the frame QP, and M is the number of blocks in the frame. In a further embodiment, the multiplication factor $[TCSF_{frame}/(TCSF_{block} \times M)]$ may be scaled to prevent the final values of $QP_{block}$ from becoming too high or too low relative to $QP_{frame}$.

In an alternative embodiment, the block-by-block adjustment of the QP via the TCSF map can be accomplished without reference to the full TCSF map for the frame. In this embodiment, the calculation of $QP_{block}$ is simpler: $QP_{block}=QP_{frame}/TCSF_{block}$. In one embodiment, the resulting value of $QP_{block}$ is clipped so that it does not exceed a predetermined maximum or minimum QP value for the frame: $QP_{min} \leq QP_{block} \leq QP_{max}$.

In another embodiment, the outputs of the SCM may be used to modify the quantization parameter on a block-by-block basis using a rule-based approach. This embodiment begins by assigning blocks with high variance a high QP value (low quality), because highly-complex regions are less noticeable to the HVS. Blocks with low variance are assigned a low QP value (high quality), because less-complex regions are more noticeable to the HVS. In one embodiment, the QP assignment for a given block is bounded by the frame's maximum and minimum QP values, $QP_{max}$ and $QP_{min}$, and is scaled linearly based on the block variance relative to the variance of other blocks in the frame. In an alternative embodiment, only those blocks having variance higher than the average variance of the entire frame are assigned QP values between the frame QP, $QP_{frame}$, and $QP_{max}$, with the assignment scaled linearly such that $QP_{block}=[var_{block}-var_{frame}]/var_{block}]*(QP_{max}-QP_{frame})+QP_{frame}$, where $var_{block}$ is the variance of a given macroblock and $var_{frame}$ is the average variance of the entire frame. In this alternative embodiment, the QP assignment for high-variance blocks may be further refined by the TCSF. For example, if the block is considered a foreground data in the TMVM and the TCSF has a log contrast sensitivity value (vertical axis in FIG. 5) less than 0.5, meaning that the block is temporally unimportant, $QP_{block}$ is raised by 2. In an alternative embodiment, an edge detection process can be applied and blocks containing edges can have their QPs adjusted to $QP_{min}$, overwriting the previously-assigned QPs from spatial complexity, because edges are particularly noticeable to the HVS. In a further embodiment, blocks that are either very bright or very dark can have their QPs adjusted to $QP_{max}$, again by overwriting the previously-assigned QPs from variance and (if applicable) from edge detection, because very dark or very bright regions are not noticeable to the HVS. This process is known as luminance masking.

In a further embodiment to the above, the value of $QP_{max}$ for high-variance blocks may be determined dynamically based on the quality level of the encoded video. The idea is that low-quality encodings cannot afford any quality drop in high-variance blocks, so $QP_{max}$ should be closer to $QP_{frame}$, whereas high-quality encodings can afford an increased $QP_{max}$ for high-variance blocks, to save bits. The quality of the encoding may be updated at each I (Intra) frame by calculating the average SSIM of blocks having variance within 5% of the average frame variance, with higher SSIM values corresponding to greater values of $QP_{max}$. In an alternative embodiment, the average SSIM is adjusted by the average variance of the frame, so that the quality indicator is calculated as the product of the average SSIM and the average frame variance.

In a further embodiment to the above, very-low-variance blocks (corresponding to flat regions, which are especially visible to the HVS), may be assigned fixed, low QP values to ensure high-quality encoding in those regions. For example, for I (Intra) frames, blocks with variance between 0 and 10 may be assigned QP=28, blocks with variance between 10 and 30 may be assigned QP=30, and blocks with variance between 30 and 60 may be assigned QP=32. QP assignments for blocks in P-frames and B-frames may then be derived from the above QPs using the ipratio and pbratio encoding parameters.

In a further embodiment to the above, low variance blocks (for example, those having variance between 60 and the average frame variance) are assigned the frame QP, $QP_{frame}$, and then examined to determine whether further quality enhancement is needed. In one embodiment, one can detect blockiness artifacts by comparing the spatial complexity and luminance of both the reconstructed pixels and the original pixels from the current (target) block being encoded with the spatial complexity and luminance of previously-encoded surrounding blocks (e.g., blocks to the left, top-left, top, and top-right when available). If there is a large difference between the spatial complexity and luminance measures of the reconstructed pixels of the target block and the corresponding measures of neighboring blocks, but there is no such difference in spatial complexity and luminance between the original pixels of the target block and that of the neighboring blocks, then the target block is considered "blocky." In this case, the block's QP value is decreased (e.g., decreased by 2) to improve the encoding quality of the block. In another embodiment, the estimated quality of the target block is calculated by averaging the SSIM and QP values of previously-encoded surrounding blocks (e.g., blocks to the left, top-left, right, and top-right when available). The average QP value, $QP_{avg}$, is the estimated QP, $QP_{block}$, for the target block. If the average SSIM value, $SSIM_{est}$, is lower than 0.9, $QP_{block}=QP_{avg}$ is lowered by 2, increasing its quality. In a further embodiment, if the target block is identified as foreground data by the TMVM, then $QP_{block}$ is lowered by 2 only if the TCSF has a log contrast sensitivity value (vertical axis in FIG. 5) greater than 0.8, meaning that the block is temporally important.

In another set of embodiments, block-by-block spatial QP offsets are determined during look-ahead processing, prior to frame encoding, using only data available independent of encoding. First, edge strength may be calculated on a pixel-by-pixel basis as the sum of horizontal and vertical edge strength. Horizontal edge strength edgeX may be measured by the absolute value of the difference between a pixel and its neighboring pixel to the left: edgeX=abs(curPixel−leftPixel). Vertical edge strength edgeY may be measured by the absolute value of the difference between a pixel and its neighboring pixel on top: edgeY=abs(curPixel−topPixel). Total edge strength edgeTot may be taken to be the sum of the horizontal and vertical edge strengths: edgeTot=edgeX+edgeY, where edgeTot is clipped to 255, the maximum allowable pixel value. The edge strength for an entire macroblock, edgeMB, may then be calculated as the average edge strength of all the pixels in the macroblock, which for 16×16 macroblocks total 256 pixels: edgeMB=$(1/256)*[\Sigma_{k=1}^{256}(edgeTot)_k]$. The value of edgeMB may be normalized to a round number such as 10 by scaling relative to the maximum value of edgeTot, 255: edgeMBnorm=10*edgeMB/255.

Macroblocks may be characterized by a combination of their block variance $var_{block}$, their edge strength edgeMBnorm, and the edge strengths of surrounding macroblocks. Macroblocks having low edge strength (edgeMBnorm<1) may be classified as flat macroblocks (if $var_{block}$<400) or clean edges (if $var_{block}$>400). Macroblocks having high edge strength (edgeMBnorm>1) may be classified as either complex edges (if surrounding macroblocks have edge strengths less than 1) or complex macroblocks (if no surrounding macroblocks have edge strengths less than 1).

Normalized edge strength edgeMBnorm may then be used to adjust the block variance by multiplying the two quantities together: $var_{block-adj}=edgeMBnorm*var_{block}$. Thus, values of edgeMBnorm less than 1 will decrease block variance and values greater than 1 will increase it. Because low values of edge strength may result from either macroblocks with clean edges (which will have high variance) or flat macroblocks (which will already have low variance), the edge strength downward adjustment should only be applied to macroblocks with variance greater than 400, i.e., for clean edge macroblocks.

In a further embodiment, the spatial QP offset for each macroblock, $QP_{spatial-offset}$, is determined from the adjusted block variance $var_{block-adj}$ by means of a table lookup. The table may be determined by empirical experimentation by examining encoding quality in several videos for various QP values. The table will vary depending on the encoder and the encoding standard. A sample table for H.264 I-frames is listed below.

TABLE 1 spatial QP offset as function of adjusted block variance, for H.264 encoding

| $var_{block-adj}$ | | $QP_{spatial-offset}$ |
|---|---|---|
| From | To | (I-frames) |
| 0 | 9 | −5 |
| 10 | 29 | −4 |
| 30 | 59 | −3 |
| 60 | 99 | −2 |
| 100 | 199 | −1 |
| 200 | 399 | 0 |
| 400 | 999 | +1 |
| 1000 | 1499 | +3 |
| 1500 | 2499 | +5 |
| 2500 | 3999 | +7 |
| 4000 | 5999 | +9 |
| 6000 | 7999 | +11 |
| 8000 | and above | +13 |

The frame QP, $QP_{frame}$, may be made to correspond with the "neutral zone" of medium block variance (200 to 399), where $QP_{spatial-offset}=0$. Thus, macroblocks with variance in the neutral zone have their block QP $QP_{block}=QP_{frame}$. $QP_{frame}=33$ for I-frames and is slightly higher for P-frames and B-frames, depending on the values of the ipratio and pbratio parameters.

In a further embodiment, the spatial QP offset, $QP_{spatial-offset}$, may be refined further based on additional considerations. For example, if the original block variance $var_{block}$ and adjusted block variance $var_{block-adj}$ are on different sides of the "neutral zone" (i.e., $var_{block}>400$ but $var_{block-adj}<200$), then $QP_{spatial-offset}$ is set to 0. Additionally, if a given block is identified from edge strength analysis as either a clean edge or a complex edge macroblock and the calculated $QP_{spatial-offset}$ is greater than 0, the value of $QP_{spatial-offset}$ may be divided by 2 to limit the QP increase (quality decrease) for edges.

In a further embodiment, the minimum allowable QP in the frame, $QP_{min}$, for a frame to be encoded may be determined based on the complexity of the frame data (measured in terms of average edge strength and average variance of the macroblocks in the frame), the tightness of the bit budget (measured via the difference between the maximum allowable QP in the frame, $QP_{max}$, and the frame QP, $QP_{frame}$), and the frame type (whether the frame is a reference frame or not). When the content is simple, the bit budget is tight, and the frame is not a reference frame, the minimum frame QP is close to the frame QP. When the content is complex, the bit budget is "slack" (i.e., there are plenty of available bits), and the frame is a reference frame, the minimum frame QP may be several units (up to 10 units) lower than the frame QP.

In a further embodiment, the block QP of each macroblock, $QP_{block}$, may be determined from a combination of the spatial offset $QP_{spatial-offset}$ determined as above during look-ahead processing and a temporal offset $QP_{temporal-offset}$ determined during frame encoding. First, the initial block QP, $QP_{block-init}$, for each macroblock is set based on the block variance $var_{block}$. If $var_{block}$ is greater than or equal to 60, $QP_{block-init}$ is set to the frame QP, $QP_{frame}$. If $var_{block}$ is less than 60, $QP_{block-init}$ is set to a "visibility threshold QP," which is 28 for I-frames and slightly higher for P-frames and B-frames, depending on the values of the ipratio and pbratio encoding parameters. The value of $QP_{block-init}$ is then clipped if it is either greater than the maximum allowable QP, $QP_{max}$, or less than the minimum allowable QP, $QP_{min}$. Finally, the block QP $QP_{block}$ is calculated as the sum of the initial block QP, the spatial offset, and the temporal offset: $QP_{block}=QP_{block-init}+QP_{spatial-offset}+QP_{temporal-offset}$. If the frame is not a reference frame, the temporal offset is zero. If $QP_{block}$ is lower than $QP_{min}$, $QP_{block}$ is clipped to $QP_{min}$, the minimum allowable QP in the frame.

In a further embodiment, the temporal offset $QP_{temporal-offset}$ may be determined via the TCSF as detailed above, via an algorithm such as the MBTree algorithm found in the x264 encoder that determines the encoding importance of each macroblock for inter-prediction in future frames (where blocks of greater importance are assigned more negative temporal offsets), or via a modification of the MBTree algorithm.

In another embodiment, luminance level matching is employed to improve perceptual encoding quality further. A luminance level mismatch occurs when the luminance level differs between a current inter-predicted frame (P-frame or B-frame) and one or more reference frames. In this case, the encoder may still choose skip mode (PSkip for P-frames and B Skip for B-frames), reusing an existing motion vector that points to a region in a reference frame with a different luminance level than in the current frame; this in turn can cause noticeable patches of brighter or darker regions in the reconstructed encoding of the current frame. To mitigate this mismatch, in cases where skip mode is chosen, an intra encoding mode (16×16 intra) is also checked to see if the intra mode has lower rate-distortion cost than the skip mode; if so, the intra mode is chosen instead of the skip mode.

The methods outlined above may use temporal importance maps (the TCSF, with or without TMVM refinement), spatial importance maps (the SCM), or both. If both temporal and spatial importance maps are used, the result is termed a unified importance map.

Importance maps, generated from perceptual statistics as described above, can be applied to any video compression framework that uses motion compensation to produce motion vectors, such that both rate-distortion analysis and quantization are enhanced to produce visually superior encodings for the same encoding sizes. The use of importance maps for video compression does not require specific application to the continuous block tracker (CBT) as detailed above. However, the CBT provides the additional capability of accurately determining which motion vectors are true motion vectors, so importance maps are more effective in a CBT-based encoding framework. The particular reason for this is that the CBT's frame-to-frame motion vectors (from frame-to-frame tracking 210 in FIG. 8A) are generated from the original frames of the video and not the reconstructed frames. The frame store 85 in FIG. 2 and FIG. 7 for general encoders contains reconstructed frames generated from the encoding process, but the frame store 205 in FIG. 3, FIG. 4, and FIG. 8A contains the original video frames. Because of this, the CBT's frame-to-frame tracking (210 in FIGS. 3, 4, and 8) is better able to track the true motion of the video, and its frame-to-frame motion vectors generate more accurate true motion vector maps. By contrast, a general encoder's motion vectors are selected to optimize rate-distortion (compression) performance and may not reflect the true motion of the video.

It should also be noted that importance maps, once generated, may be applied to intra-predicted frames as well, either by modifying the rate-distortion optimization among intra-prediction modes or by modifying the block-level quantization, following the techniques described above. For all-intra encoders, however, computation of the TCSF requires a separate encoding module (such as frame-to-frame tracking 210 in FIG. 8A) to generate motion vectors for each data block in the video frame.

Digital Processing Environment

Example implementations of the present invention may be implemented in a software, firmware, or hardware environment. FIG. 9A illustrates one such environment. Client computer(s)/devices 950 (e.g., mobile phones or computing devices) and a cloud 960 (or server computer or cluster thereof) provide processing, storage, encoding, decoding, and input/output devices executing application programs and the like.

Client computer(s)/devices 950 can also be linked through communications network 970 to other computing devices, including other client devices/processes 950 and server computer(s) 960. Communications network 970 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic devices/computer network architectures are suitable.

Figure 9B:
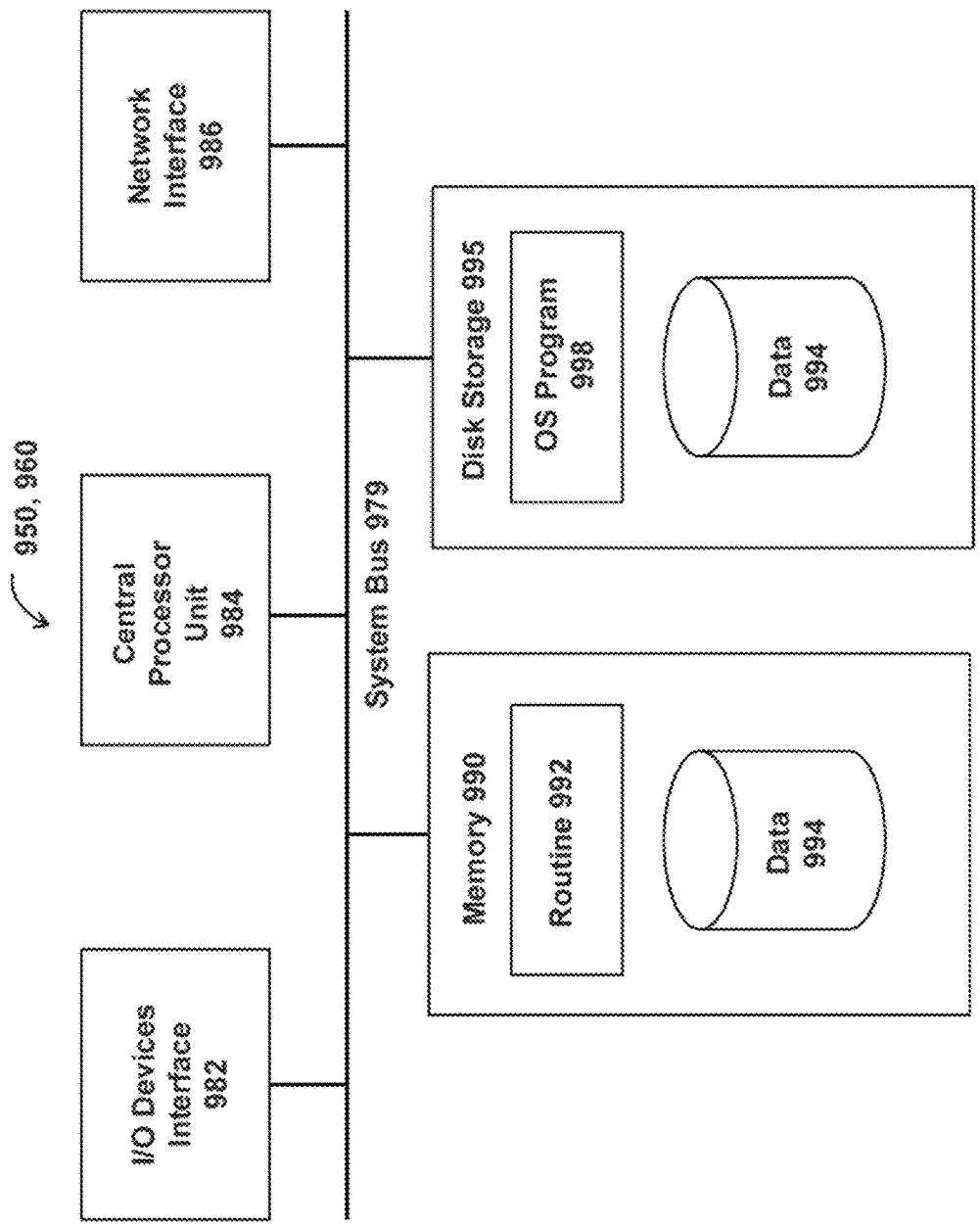
FIG. 9B is a block diagram of the computer nodes in the network of FIG. 9A.

Embodiments of the invention may include means for encoding, tracking, modeling, filtering, tuning, decoding, or displaying video or data signal information. FIG. 9B is a diagram of the internal structure of a computer/computing node (e.g., client processor/device/mobile phone device/tablet 950 or server computers 960) in the processing environment of FIG. 9A, which may be used to facilitate encoding such videos or data signal information. Each computer 950, 960 contains a system bus 979, where a bus is a set of actual or virtual hardware lines used for data transfer among the components of a computer or processing system. Bus 979 is essentially a shared conduit that connects different elements of a computer system (e.g., processor, encoder chip, decoder chip, disk storage, memory, input/output ports, etc.) that enables the transfer of data between the elements. Attached to the system bus 979 is an I/O device interface 982 for connecting various input and output devices (e.g., keyboard, mouse, displays, printers, speakers, etc.) to the computer 950, 960. Network interface 986 allows the computer to connect to various other devices attached to a network (for example, the network illustrated at 970 of FIG. 9A). Memory 990 provides volatile storage for computer software instructions 992 and data 994 used to implement a software implementation of the present invention (e.g., codec: encoder/decoder).

Disk storage 995 provides non-volatile storage for computer software instructions 998 (equivalently "OS program") and data 994 used to implement an embodiment of the present invention: it can also be used to store the video in compressed format for long-term storage. Central processor unit 984 is also attached to system bus 979 and provides for the execution of computer instructions. Note that throughout the present text, "computer software instructions" and "OS program" are equivalent.

In one example, an encoder may be configured with computer readable instructions 992 to encode video data using importance maps formed from temporal information or spatial information. The importance maps may be configured to provide a feedback loop to an encoder (or elements thereof) to optimize the encoding/decoding of video data.

In one embodiment, the processor routines 992 and data 994 are a computer program product, with an encoder (generally referenced 992), including a computer readable medium capable of being stored on a storage device 994 which provides at least a portion of the software instructions for the encoder.

The computer program product 992 can be installed by any suitable software installation procedure, as is well known in the art. In another embodiment, at least a portion of the encoder software instructions may also be downloaded over a cable, communication, and/or wireless connection. In other embodiments, the encoder system software is a computer program propagated signal product 907 (in FIG. 9A) embodied on a nontransitory computer readable medium, which when executed can be implemented as a propagated signal on a propagation medium (e.g., a radio wave, an infrared wave, a laser wave, a sound wave, or an electrical wave propagated over a global network such as the Internet, or other network(s)). Such carrier media or signals provide at least a portion of the software instructions for the present invention routines/program 992.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 992 is a propagation medium that the computer system 950 may receive and read, such as by receiving the propagation medium and identifying a propagated signal embodied in the propagation medium, as described above for the computer program propagated signal product.

While this invention has been particularly shown and described with references to example embodiments thereof, it will be understood by those skilled in the art that various changes in form and details may be made therein without departing from the scope of the invention encompassed by the appended claims.

What is claimed is:

1. A method of encoding a plurality of video frames having non-overlapping target blocks, the method comprising:

encoding the plurality of video frames using importance maps, such that the importance maps modify quantization affecting encoding quality of each target block being encoded in each video frame, the importance maps being formed by:

configuring the importance maps using temporal information and spatial information; and computationally causing the importance maps to indicate which parts of a video frame in the plurality of video frames are most noticeable to human perception, wherein:
- (i) in target blocks where the importance maps take on high values that are higher than an average value in a value range of the importance map based on perceptual statistics, reducing a block quantization parameter (QP) of each high-value target block relative to a frame quantization parameter ($QP_{frame}$) of the video frame, resulting in increasing quality for the high-value target blocks, and
- (ii) in target blocks where the importance maps take on low values that are lower than an average value in a value range of the importance map based on perceptual statistics, increasing a block quantization parameter (QP) of each low-value target block relative to the frame quantization parameter ($QP_{frame}$), resulting in decreasing quality for the low-value target blocks, and
- (iii) representing each reduction in block QP of high-value target blocks or increase in block QP of the low-value target blocks in the importance map as a QP offset;

wherein the spatial information for the importance maps is provided by a lookup table based on block variance, the lookup table indicating spatial QP offsets including negative spatial QP offsets for block variances lower than 200 and positive spatial QP offsets for block variances above 400;

wherein the temporal information for the importance maps is provided by an algorithm that determines encoding importance of each target block of the video frame for inter-prediction in future video frames, the algorithm assigning the target blocks spatial QP offsets, including assigning high-value target blocks negative temporal QP offsets; and wherein total QP offset for a given target block is equal to spatial QP offset of the given target block plus temporal QP offset of the given target block, clipped to maximum and minimum allowable QP values in the video frame.

2. The method as in claim 1, further comprising:

for each target block, adjusting block variance of the target block by edge strength, comprising:

calculating edge strength for each pixel in the target block by taking differences with neighboring pixels, and calculating edge strength for the target block by averaging the calculated edge strengths of each pixel in the target block;

classifying the target block as either a flat macroblock, a clean edge, a complex edge, or a complex macroblock based on the calculated edge strength for the target block, block variance for the target block, and the edge strength of neighboring target blocks;

if the target block is classified as a clean edge, adjusting block variance of the target block downward; and if the target block is classified as a complex edge, adjusting block variance of the target block upward.

3. The method as in claim 2, further comprising:

setting the spatial QP offset of the target block to 0, if original block variance of the target block is greater than 400 and block variance of the target block adjusted based on edge strength is less than 200.

4. The method as in claim 2, further comprising:

reducing a positive spatial QP offset for the target block by a factor of 2, if the target block is classified as either a clean edge or a complex edge.

5. The method as in claim 1, wherein a minimum allowable QP in the video frame ($QP_{min}$) is determined based on complexity of content of the video frame, tightness of bit budget, and frame type.

6. The method as in claim 1, further comprising:

setting an initial estimate of block QP for each target block ($QP_{block\text{-}init}$) to 28 for I-frames, 30 for P-frames, and 33 for B-frames, if block variance of the target block is less than 60 and to $QP_{frame}$, if the block variance of the target block is greater than or equal to 60.

7. The method as in claim 6, further comprising:

calculating a final block QP of each target block ($QP_{block}$) by summing $QP_{block\text{-}init}$ and the total QP offset of the target block; and if the calculated $QP_{block}$ is less than $QP_{min}$, setting $QP_{block}$ to $QP_{min}$.

8. The method as in claim 1, further comprising:

applying luminance level matching to the video frame by considering an intra encoding mode involving a decision of a skip mode;

comparing rate-distortion cost of the intra mode and rate-distortion cost of the skip mode; and if the rate-distortion cost of the intra mode is lower than the rate-distortion cost of the skip mode, choosing the intra mode.

9. A computer system encoding a plurality of video frames having non-overlapping target blocks, the computer system comprising:

at least one processor executing an encoder;

the encoder encoding the plurality of video frames using importance maps, such that the importance maps modify quantization affecting encoding quality of each target block being encoded in each video frame, the importance maps being formed by:

configuring the importance maps using temporal information and spatial information; and computationally causing the importance maps to indicate which parts of a video frame in the plurality of video frames are most noticeable to human perception, wherein:
- (i) in target blocks where the importance maps take on high values that are higher than an average value in a value range of the importance map based on perceptual statistics, reducing a block quantization parameter (QP) of each high-value target block relative to a frame quantization parameter ($QP_{frame}$) of the video frame, resulting in increasing quality for the high-value target blocks,
- (ii) in target blocks where the importance maps take on low values that are lower than an average value in a value range of the importance map based on perceptual statistics, increasing a block quantization parameter (QP) of each low-value target block relative to the frame quantization parameter ($QP_{frame}$), resulting in decreasing quality for the low-value target blocks, and
- (iii) representing each reduction in block QP of high-value target blocks or increase in block QP of the low-value target blocks in the importance map as a QP offset;

wherein the spatial information for the importance maps is provided by a lookup table based on block variance, the lookup table indicating spatial QP offsets, including negative spatial QP offsets for block variances lower than 200 and positive spatial QP offsets for block variances above 400;

wherein the temporal information for the importance maps is provided by an algorithm that determines encoding importance of each target block of the video frame for inter-prediction in future video frames, the algorithm assigning target blocks spatial QP offsets, including assigning high-value target blocks negative temporal QP offsets; and wherein total QP offset for a given target block is equal to spatial QP offset of the given target block plus temporal QP offset of the given target block, clipped to the maximum and minimum allowable QP values in the video frame.

10. The computer system as in claim 9, wherein, for each target block, the encoder adjusts block variance by edge strength by:
   calculating edge strength for each pixel in the target block by taking differences with neighboring pixels, and calculating edge strength for the target block by averaging the calculated edge strengths of each pixel in the target block;
   classifying the target block as either a flat macroblock, a clean edge, a complex edge, or a complex macroblock based on the calculated edge strength for the target block, block variance for the target block, and the edge strength of neighboring target blocks;
   if the target block is classified as a clean edge, adjusting block variance of the target block downward; and
   if the target block is classified as a complex edge, adjusting block variance of the target block upward.

11. The computer system as in claim 10, wherein the encoder sets the spatial QP offset of the target block to 0 if original block variance of the target block is greater than 400 and block variance of the target block adjusted based on edge strength is less than 200.

12. The computer system as in claim 10, wherein the encoder reduces a positive spatial QP offset for the target block by a factor of 2, if the target block is classified as either a clean edge or a complex edge.

13. The computer system as in claim 9, wherein the encoder determines a minimum allowable QP in the video frame ($QP_{min}$) based on complexity of content of the video frame, tightness of bit budget, and frame type.

14. The computer system as in claim 9, wherein the encoder sets an initial estimate of block QP for each target block ($QP_{block\text{-}init}$) to 28 for I-frames, 30 for P-frames, and 33 for B-frames, if block variance of the target block is less than 60 and to $QP_{frame}$, if the block variance of the target block is greater than or equal to 60.

15. The computer system as in claim 14, wherein the encoder calculates a final block QP of each target block ($QP_{block}$) by summing $QP_{block\text{-}init}$ and the total QP offset of the target block, and
   if the calculated $QP_{block}$ is less than $QP_{min}$, the encoder sets $QP_{block}$ to $QP_{min}$.

16. The computer system as in claim 9, wherein the encoder choses an intra encoding mode by:
   applying luminance level matching by considering an intra encoding mode involving a decision of a skip mode;
   comparing rate-distortion cost of the intra mode and rate-distortion cost of the skip mode; and
   if the rate-distortion cost of the intra mode is lower than the rate-distortion cost of the skip mode, choosing the intra encoding mode.

17. A computer program product having computer readable program code stored on a non-transitory storage medium, the computer readable program code causing a plurality of video frames having non-overlapping target blocks to be encoded, the computer comprising:
   the computer readable program code implementing an encoder encoding the plurality of video frames using importance maps, such that the importance maps modify quantization affecting encoding quality of each target block to be encoded in each video frame, the importance maps being formed by the encoder:
   configuring the importance maps using temporal information and spatial information; and
   computationally causing the importance maps to indicate which parts of a video frame in the plurality of video frames are most noticeable to human perception, wherein:
   (i) in target blocks where the importance maps take on high values that are higher than an average value in a value range of the importance map based on perceptual statistics, reducing a block quantization parameter (QP) of each high-value target block relative to a frame quantization parameter ($QP_{frame}$), resulting in increasing quality for the high-value target blocks, and
   (ii) in target blocks where the importance maps take on low values that are lower than an average value in a value range of the importance map based on perceptual statistics, increasing a block quantization parameter (QP) of each low-value target block relative to the frame quantization parameter ($QP_{frame}$), resulting in decreasing quality for the low-value target blocks, and
   (iii) representing each reduction in block QP of high-value target blocks or increase in block QP of the low-value target blocks in the importance map as a QP offset;
   wherein the spatial information for the importance maps is provided by a lookup table based on block variance, the lookup table indicating spatial QP offsets including negative spatial QP offsets for block variances lower than 200 and positive spatial QP offsets for block variances above 400;
   wherein the temporal information for the importance maps is provided by an algorithm that determines encoding importance of each target block of the video frame for inter-prediction in future video frames, the algorithm assigning the target blocks spatial QP offsets, including assigning high-value target blocks negative temporal QP offsets; and
   wherein total QP offset for a given target block is equal to spatial QP offset of the given target block plus temporal QP offset of the given target block, clipped to maximum and minimum allowable QP values in the video frame.

* * * * *